(12) United States Patent
Zhang et al.

(10) Patent No.: US 10,708,729 B2
(45) Date of Patent: Jul. 7, 2020

(54) OUTPUTTING AN ENTRY POINT TO A TARGET SERVICE

(71) Applicant: Alibaba Group Holding Limited, George Town (KY)

(72) Inventors: Yanan Zhang, Beijing (CN); Jing Gao, Beijing (CN); Xun Wang, Hangzhou (CN); Mingsen Hu, Beijing (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 16/573,819

(22) Filed: Sep. 17, 2019

(65) Prior Publication Data
US 2020/0092689 A1     Mar. 19, 2020

(30) Foreign Application Priority Data
Sep. 18, 2018 (CN) .......................... 2018 1 1089948

(51) Int. Cl.
*H04M 3/42* (2006.01)
*H04W 4/20* (2018.01)
*H04W 4/02* (2018.01)
*H04W 4/021* (2018.01)

(52) U.S. Cl.
CPC .............. *H04W 4/20* (2013.01); *H04W 4/021* (2013.01); *H04W 4/027* (2013.01)

(58) Field of Classification Search
CPC ......... H04W 4/04; H04W 4/33; H04W 4/029; H04W 4/023; H04W 4/20; G06N 5/02; G01C 21/00; G01C 21/34; G01C 21/36; G06F 15/00; G08B 3/10; G08B 5/36; H04B 1/3838; G09G 5/00; H04L 29/06; H04L 63/1425; H04L 63/1441; G06K 9/6267; G06K 9/6284; G06K 9/6247; G06K 9/6222; G06K 9/6251; G06K 9/6218
USPC .............................. 455/414.1; 701/533, 400
See application file for complete search history.

(56) References Cited

U.S. PATENT DOCUMENTS

| 6,987,581 B2 * | 1/2006 | Silverbrook .......... G06F 3/0321 358/1.15 |
| 7,626,569 B2 * | 12/2009 | Lanier ................... G06F 1/1601 345/156 |
| 7,706,964 B2 * | 4/2010 | Horvitz .............. G01C 21/3492 342/357.31 |

(Continued)

FOREIGN PATENT DOCUMENTS

| CN | 105244584 A | * 1/2016 |
| KR | 20100112314 A | * 10/2010 |

(Continued)

*Primary Examiner* — Mahendra R Patel
(74) *Attorney, Agent, or Firm* — Van Pelt, Yi & James LLP

(57) ABSTRACT

Outputting an entry point to a target service is disclosed, including: determining that a set of sensed data that is obtained from a first device meets a condition associated with a detectable event, wherein the set of sensed data is determined by one or more sensors associated with the first device; in response to the determination, determining a target service corresponding to the detectable event; determining a selected device among the first device and at least one second device, wherein the at least one second device is related to the first device; and outputting an entry point corresponding to the target service to the selected device, wherein the entry point is usable to access the target service.

21 Claims, 13 Drawing Sheets

(56) References Cited

U.S. PATENT DOCUMENTS

| | | | |
|---|---|---|---|
| 8,358,224 B2* | 1/2013 | Seder | G01S 13/931 340/995.24 |
| 8,589,069 B1* | 11/2013 | Lehman | G01C 21/20 701/438 |
| 9,477,313 B2* | 10/2016 | Mistry | G04G 17/04 |
| 10,060,751 B1* | 8/2018 | Chen | G01C 21/32 |
| 10,222,891 B1* | 3/2019 | Smith | G06F 3/0412 |
| 10,343,605 B1* | 7/2019 | Fields | G06Q 40/08 |
| 2008/0005287 A1* | 1/2008 | Harvey | G06F 8/20 709/220 |
| 2008/0071770 A1* | 3/2008 | Schloter | G06F 16/487 |
| 2010/0100310 A1* | 4/2010 | Eich | G08G 1/096872 701/533 |
| 2010/0114476 A1* | 5/2010 | Hsu | G01C 21/3682 701/533 |
| 2011/0313651 A1* | 12/2011 | Hyde | G08B 3/10 701/400 |
| 2012/0191289 A1 | 7/2012 | Guo | |
| 2012/0271713 A1 | 10/2012 | Nussel | |
| 2013/0080043 A1* | 3/2013 | Ballin | G08G 5/0034 701/120 |
| 2013/0242262 A1* | 9/2013 | Lewis | G02B 27/0093 351/209 |
| 2016/0198309 A1* | 7/2016 | Yoo | H04W 4/33 455/456.1 |
| 2017/0180946 A1 | 6/2017 | Wormald | |
| 2018/0255084 A1* | 9/2018 | Kotinas | H04L 63/1425 |
| 2019/0049256 A1* | 2/2019 | Camp | B60W 40/068 |
| 2019/0113995 A1* | 4/2019 | Kies | G06F 3/048 |
| 2019/0200799 A1* | 7/2019 | Meshulam | B41J 3/407 |

FOREIGN PATENT DOCUMENTS

| | | | |
|---|---|---|---|
| KR | 101896405 B1 * | 9/2018 | |
| WO | WO-2005103624 A2 * | 11/2005 | G06F 16/2379 |

* cited by examiner

OUTPUTTING AN ENTRY POINT TO A TARGET SERVICE

CROSS REFERENCE TO OTHER APPLICATIONS

This application claims priority to People's Republic of China Patent Application No. 201811089948.3 entitled A DATA PROCESSING METHOD, APPARATUS, AND MACHINE-READABLE MEDIUM filed Sep. 18, 2018 which is incorporated herein by reference for all purposes.

FIELD OF THE INVENTION

The present application relates to a field of communication technology. In particular, the present application relates to techniques for outputting entry points to services.

BACKGROUND OF THE INVENTION

As communication technology develops, major Internet enterprises have started introducing one mobile Internet-based service after another. Among these, location based services (LBS) have grown steadily in importance. LBS acquires terminal location information through a positioning approach. With the support of a geographic information system platform, LBS provides users with corresponding value-added services. For example, upon detecting that a user has entered a mall, a LBS could provide the user with shop information associated with shops that are located within the mall.

Some existing technology can provide services through applications. However, a user would typically need to search among applications on his or her terminal for the application corresponding to the required service and then install and/or execute it. However, some users do not know which application corresponds to the desired service and consequently, cannot obtain the desired service. Moreover, application searches often require the user to physically (e.g., use their fingers to) input search words, and inputting search words takes a certain operational effort. Moreover, if the user is using a vehicle-mounted device, it will be relatively difficult to input search words into the vehicle-mounted device (e.g., as the user is driving).

In other related technology, services may be provided using QR codes. Accordingly, QR codes corresponding to services are placed offline. Users need to scan these QR codes with their terminals to obtain the needed services. However, placing QR codes offline has a definite cost. Moreover, if a service is changed or a new service is added, it will become necessary to place new QR codes, which is laborious. Further, in some cases the user may not know that the QR code has changed and may continue to use old information for access, thus resulting in errors.

BRIEF DESCRIPTION OF THE DRAWINGS

Various embodiments of the invention are disclosed in the following detailed description and the accompanying drawings.

DETAILED DESCRIPTION

Figure 1:
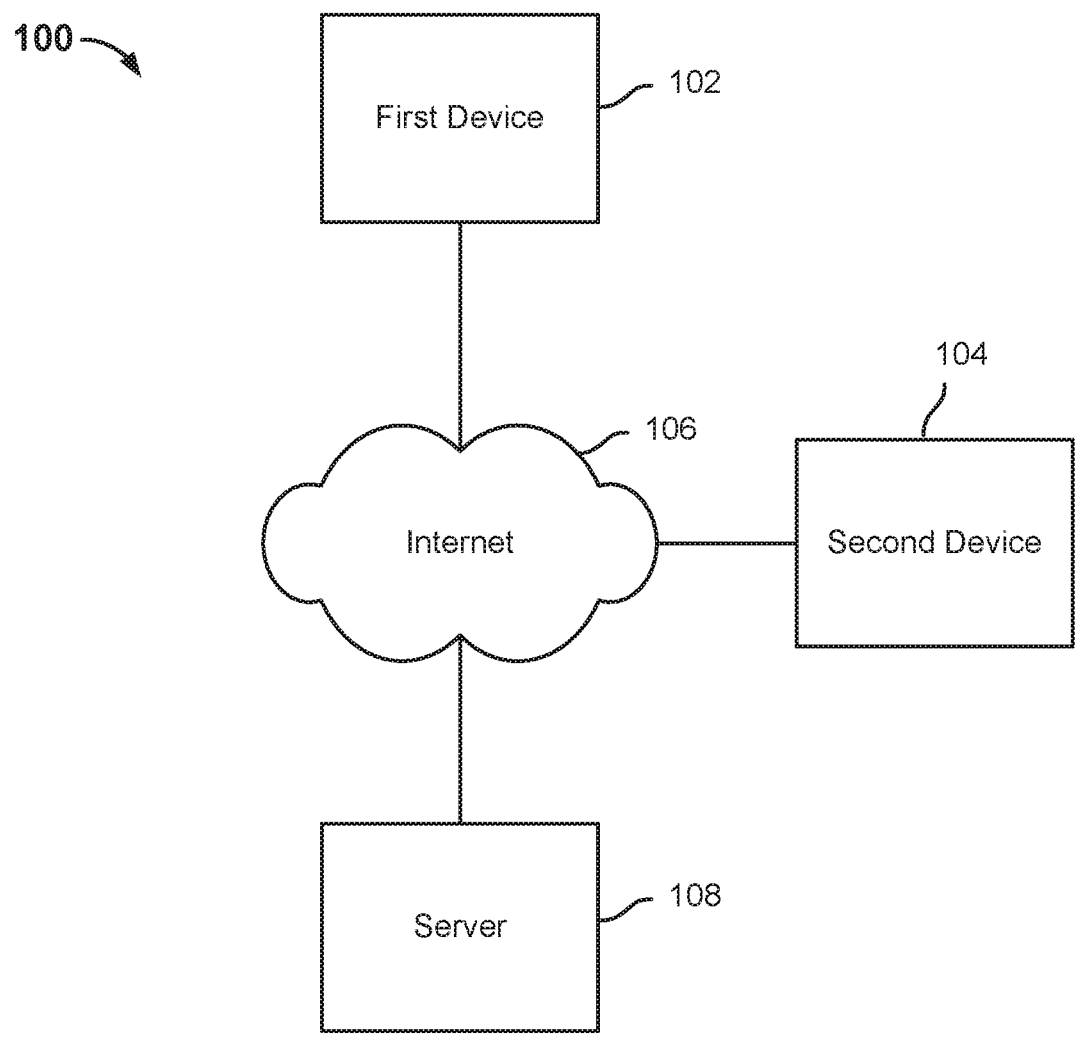
FIG. 1 is a diagram showing an embodiment of a system for outputting an entry point to a target service.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

To make the above-described objectives, features, and advantages of the present application plainer and easier to understand, the present application is explained in further detail below in light of the drawings and specific embodiments.

The technical schemes in the embodiments of the present application will be clearly and completely described in light of the drawings in specific embodiments of the present application. Obviously, the described embodiments are merely some of the embodiments of the present application and not all the embodiments. All other embodiments obtained by persons with ordinary skill in the art based on the embodiments of the present application fall under the scope of protection of the present application.

The concepts of the present application may easily undergo various modifications and substitutions, and its specific embodiments have already been shown in the drawings and in detailed descriptions herein. However, please note that the purpose of the content described above is not to limit the concepts of the present application to the disclosed specific forms. On the contrary, the intention of the description and the attached claims of the present application is to cover all modified, equivalent, and substituted forms.

"An embodiment," "embodiments," "a specific embodiment" and other such wording in this description indicate that the described embodiment may include specific features, structures, or characteristics. However, each embodiment may or may not necessarily include these particular features, structures, or characteristics. In addition, such phrases do not necessarily refer to the same embodiment. In addition, where specific features, structures, or characteristics are described in connection to an embodiment, it may be assumed that, whether or not they are described explicitly, such features, structures, or characteristics are related to other embodiments within the scope of knowledge of persons skilled in the art. In addition, please understand that the items in a list taking the form of "at least one of A, B and C" may include the following possible items: (A), (B), (C), (A and B), (A and C), (B and C), or (A, B and C). Likewise, items listed in the form of "at least one of A, B or C" may include: (A), (B), (C), (A and B), (A and C), (B and C), or (A, B and C).

In some cases, the disclosed embodiment may be implemented as hardware, firmware, software, or any combination thereof. A disclosed embodiment may also be implemented as instructions that are carried or stored in one or more temporary or non-temporary machine-readable (e.g., computer-readable) storage media. These instructions can be executed by one or more processors. Machine-readable media may be implemented as storage means, mechanisms, or other physical structures (e.g., volatile or non-volatile memory, disks, or other media or other physical structure devices) for storing or transmitting information in machine-readable form.

In the drawings, some structures or method features may be displayed in specific arrangements and/or sequences. However, preferably, such specific arrangements and/or sequences are not necessary. On the contrary, in some embodiments, such features may be laid out in ways and/or sequences that differ from what is shown in the drawings. In addition, the content of structural or method features in a specific drawing includes does not imply that such features are necessary in all embodiments. Moreover, in some embodiments, these features may not be included, or they may be combined with other features.

Embodiments of outputting an entry point to a target service are described herein. It is determined that a set of sensed data obtained from a first device meets a condition associated with a detectable event. The set of sensed data is determined by one or more sensors associated with the first device. In various embodiments, a "detectable event" comprises an event that can be determined to have occurred based on data collected by one or more types of sensors. In response to the determination, a target service corresponding to the detectable event is determined. In various embodiments, mappings between detectable events and target services are stored. In various embodiments, a "target service" comprises an activity that serves a user and from which the user benefits and in particular, when the user has experienced a corresponding detectable event. In some embodiments, a "target service" is capable of meeting a user's needs in the form of provided work and not in the form of a physical object. A selected device is determined among the first device and at least one second device that is related to the first device. An entry point corresponding to the target service is output to the selected device. In some embodiments, an "entry point" comprises data usable to access the target service. For example, the target service comprises a web page or an application.

A first example of a detectable event is: a vehicle driving into a gas station and then stopping. For example, a condition associated with determining this detectable event is a user's vehicle's location information matching that of a gas station and the vehicle's speedometer's current reading being less than a predetermined speed (e.g., one mile per hour). A set of sensed data to be compared to the condition associated with the first example of the detectable event may be a real-time location of the vehicle and also a real-time speed of the vehicle. The corresponding target service may be a fueling service relating to the fuel selection, payments, etc.

A second example of a detectable event is: a vehicle being in a traffic jam. The corresponding target service may be: receiving information about an alternative route with less traffic. A third example of a detectable event is: the tire pressure of one or more tires of a vehicle being too high or too low. The corresponding target service may be: locating a nearby vehicle maintenance or repair center and/or making an appointment for vehicle maintenance or repair.

In various embodiments, one or more conditions for determining a detectable event are configurable. In various embodiments, a target service corresponding to a detectable event is also configurable. In various embodiments, mappings between detectable events and their corresponding target services are stored.

One example of an entry point corresponding to a target service that is to be output to a device is a hyperlink or a Universal Resource Locator (URL) that points to a service-providing page of the target service. The service-providing page is for providing a service. In some embodiments, the service-providing page is a web page that is accessible using a web browser or the service-providing page is a page of an application.

In various embodiments, a plurality of devices may be determined to be related. In some embodiments, one or more devices that belong to the same user may be stored with relationships that bind the device(s) to the user and the device(s) are therefore related to each other. In some embodiments, one or more devices that belong to the same group of two or more users may be stored with relationships that bind the device(s) to the group and the device(s) are therefore related to each other. For example, users that belong in a group include a group of family members, a group of coworkers, and a group of users who share a hobby. Examples of devices may include a vehicle-mounted device (e.g., a touch screen on a vehicle, a head-up display (HUD) on a vehicle), a home appliance (e.g., a refrigerator, an air-conditioning system, or an air purifier), and/or a mobile device (e.g., a phone or a tablet). In some embodiments, different types of devices may be identified as being related to a user (or group of users) and therefore, to each other. For example, a mobile phone and a HUD on a vehicle could be related to each other. In some embodiments, a user can input identifying information (e.g., IP address, MAC address, and/or hardware information) corresponding to each device that is related to the same one or more users and to each other at a user interface. Consequently, the related relationships are stored between the devices and the one or more users to denote that the devices are related to each other and also, related to the user(s).

Various embodiments described herein may spare a user the need to search for a relevant application or other software tool that provides a service that is relevant to a concern of the user's that is detectable using collected sensor data. In various embodiments, data that is programmatically detected by one or more sensors that is included in or otherwise associated with a user's device can be determined to match a condition of a detectable event and a corresponding entry point to a relevant target service can be output to the user via the same device or a related device, all without the user's intervention. For example, a user may be driving a vehicle while the data sensed by one or more sensors (e.g., cameras, radars, etc.) on the vehicle is determined to match a condition of a detectable event for which an entry point is then presented at a device on the vehicle or another device belonging to the user, which prevents the driver user from needing to take his or her eyes off the road and from needing to remove his or her hands off the wheel in order to locate the service. Furthermore, various embodiments described herein eliminate the need and cost of setting up physical entry points to target services such as manually placing QR codes on physical locations and where a QR code is encoded with data that can be used to present a target service. In addition, various embodiments described herein allow customization of detectable events and their corresponding target services, which allows flexible, efficient, and cost-effective updating of such events and their corresponding target services in light of the existence of updates to services and the availability of new services.

In a specific example, assume that Detectable event A comprises: a user driving a vehicle into a gas station and stopping the vehicle at the gas station. The target service related to Detectable event A may include: a fueling service. Thus, if a user drives his or her vehicle into a gas station and stops the vehicle at the gas station, according to at least some embodiments, an entry point to a fueling service may be output to a device of the user's (e.g., a mobile phone or a vehicle-mounted device). For example, information pertaining to a fueling service may be presented on the screen of a vehicle-mounted device. For example, information pertaining to the fueling service may include selections for a particular grade of gas, selections for whether a gas station attendant should perform fueling of the vehicle, and/or a selection for a payment type for the selected grade of gas and/or the gas station attendant performing the refueling. In contrast, conventionally, one or more QR codes associated with accessing the fueling service may have had to be displayed on a physical poster on one or more physical locations within the gas station. Or, conventionally, a driver user would have to manually search on his or her device for an application that is associated with a fueling service.

In some embodiments, a "target service" may be a web service. In such a situation, a service-providing page for which an entry point is outputted is a web page (as opposed to a software application), and the web page may be directly run by a web engine or web browser. An example of a web page may include: a HyperText Markup Language 5 (H5) page. Therefore, in some embodiments, a target service may provide functionalities that can be provided by an application without having to install an application on the device.

In some embodiments, a "target service" may be an application. In such a situation, a service-providing page for which an entry point is outputted is a page of an application that is the target service. If the device to which the entry point is output does not have the target service application installed on it, then the device may provide a download interface for the target service application so that the user can select to complete the download, installation, and running of the target service application and load the application page associated with the outputted entry point through the target service application.

FIG. 1 is a diagram showing an embodiment of a system for outputting an entry point to a target service. In the example of FIG. 1, system 100 includes first device 102, second device 104, network 106, and server 108. Network 106 may be implemented using high-speed data and/or telecommunications networks, which may be wired or wireless. First device 102, second device 104, and server 108 communicate to each other over network 106.

Examples of each of first device 102 and second device 104 may include, but are not limited to: smart phones, tablet computers, e-readers, MP3 (Moving Picture Experts Group Audio Layer 3) players, MP4 (Moving Picture Experts Group Audio Layer 4) players, laptop computers, vehicle-mounted devices, desktop computers, set-top boxes, smart television sets, and wearable devices.

In particular, a vehicle-mounted device may refer to a device applicable to a vehicle. The vehicle-mounted device may include: a vehicle-mounted refrigerator, a vehicle-mounted computer, a vehicle-mounted charger, or a HUD. In various embodiments, an operating system may be installed in a vehicle-mounted device. The operating system may cause communication between a vehicle and the Internet (e.g., network 106), between one vehicle and another, and between a vehicle and a traffic facility. Moreover, the vehicle-mounted device may have the ability to run services.

In some embodiments, first device 102 is related to second device 104 and both devices are related to one or more users based on related relationships that are stored at server 108. In some embodiments, a user had submitted, via a user interface, to server 108, identifying information corresponding to each of first device 102 and second device 104 and indicated that they were related to each other and also to one or more users, which had stored such relationships. As will be described below, an entry point may be outputted to the same device from which a set of sensed data that corresponds to a detectable event is collected, or to a different, related device.

First device 102 is configured to include one or more sensors corresponding to one or more sensor types. Example sensor types that first device 102 may have include, but are not limited to: a Global Positioning System (GPS) sensor, a temperature sensor, a pressure sensor, an elevation sensor, an acceleration, and/or a proximity sensor. Second device 104 may also include one or more such sensors. Which types of and how many sensors each of first device 102 and second device 104 have may depend on first device 102 and second device 104's device type.

Each of first device 102 and second device 104 is configured to execute one or more types of applications. Examples of applications may include, but are not limited to: e-commerce applications, instant messaging applications, payment applications, map applications, email applications, weather applications, search applications, and/or any type of applications that provide one or more functionalities. At least some of the applications may serve as target applications associated with target services for which entry points are to be provided by server 108, as will be described below.

Server 108 is configured to store data associated with detectable events, data associated with target services, and corresponding mappings between detectable events and target services. In various embodiments, a mapping is stored between a detectable event and one or more target services. In various embodiments, data associated with a detectable event (e.g., type of detectable event field, event description field, definition of event field, a condition associated with determining the detectable event, and one or more attributes associated with types sensor data that are relevant to the detectable event) is input by a user at a user interface provided by server 108. In various embodiments, data associated with a detectable event (e.g., type of detectable event, event field, definition of event field, and one or more attributes associated with types of sensor data that are relevant to the detectable event) is input by a user at a user interface provided by server 108. In various embodiments, data associated with a target service (e.g., information associated with an entry point to the target service, device selection criteria associated with one or more devices to which the entry point can be output, descriptions about the target service) corresponding to the detectable event is input by a user at a user interface provided by server 108.

In some embodiments, first device 102 is configured to obtain data associated with detectable events from server 108. First device 102 is configured to use such data to collect relevant data from its one or more sensors. For example, if a detectable event for a user's vehicle driving to a gas station and stopping at the gas station, the data associated with the detectable event could indicate to collect the current GPS data and also the current speed of the vehicle. In some embodiments, first device 102 is configured to (e.g., periodically) send the set of sensed data back to server 108 and server 108 is configured to compare the set of sensed data associated with the one or more conditions associated with determining a detectable event to determine whether the detectable event has occurred. In some embodiments, first device 102 is configured to locally determine whether the detectable event has occurred by comparing the set of sensed data to one or more conditions associated with determining the detectable event and then send the determination to server 108.

In response to a determination that the detectable event has occurred, server 108 is configured to output an entry point corresponding to a target service corresponding to the detected detectable event to first device 102 or second device 104, or both. In some embodiments, server 108 determines which device to output the entry point corresponding to the target service based on determining device selection criteria (e.g., specified attributes) associated with one or more devices to which the entry point to the target service can be output and comparing such attributes to current attributes of first device 102 (which had collected the set of sensed data) and to current attributes of a related device, such as second device 104. Then, the device whose current attributes best match those of the target service is selected as the device to which the entry point is output. In some embodiments, outputting an entry point to a target service to a device includes sending computer program code to the device to cause a prompt to display at the display screen of the device, where the displayed prompt includes a link or URL, that once activated, causes a web page associated with the target service or a page from a target application to open. In some embodiments, outputting an entry point to a target service to a device includes sending computer program code to the device to cause a web page associated with the target service or a page from a target application to open at the display screen of the device. In some embodiments, first device 102 is configured to output an entry point to a target service corresponding to a detected detectable event in a manner similar to that described for server 108.

Figure 2:
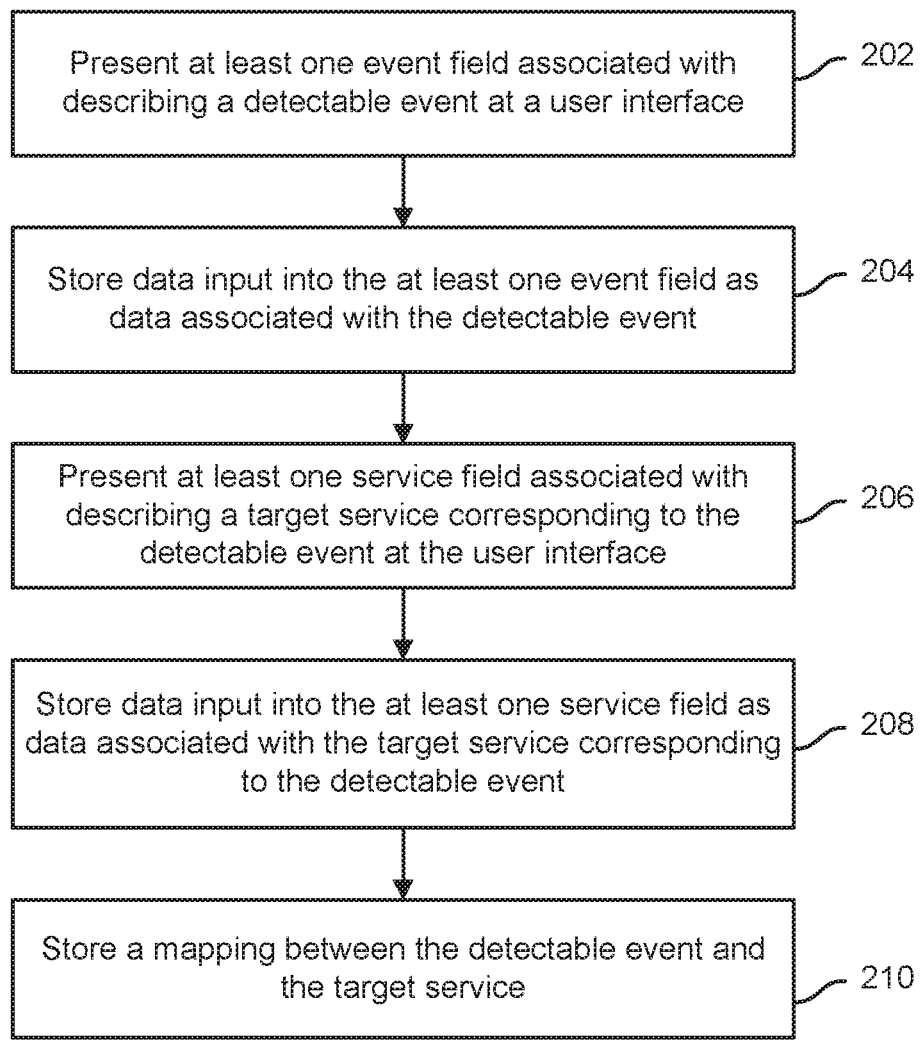
FIG. 2 is a flow diagram showing an embodiment of a process for receiving user configured data associated with a detectable event.

FIG. 2 is a flow diagram showing an embodiment of a process for receiving user configured data associated with a detectable event. In some embodiments, process 200 is implemented at system 100 of FIG. 1. Specifically, in some embodiments, process 200 is implemented at server 108 or one of first device 102 and second device 104 of system 100 of FIG. 1.

At 202, at least one event field associated with describing a detectable event is presented at a user interface.

Figure 3:
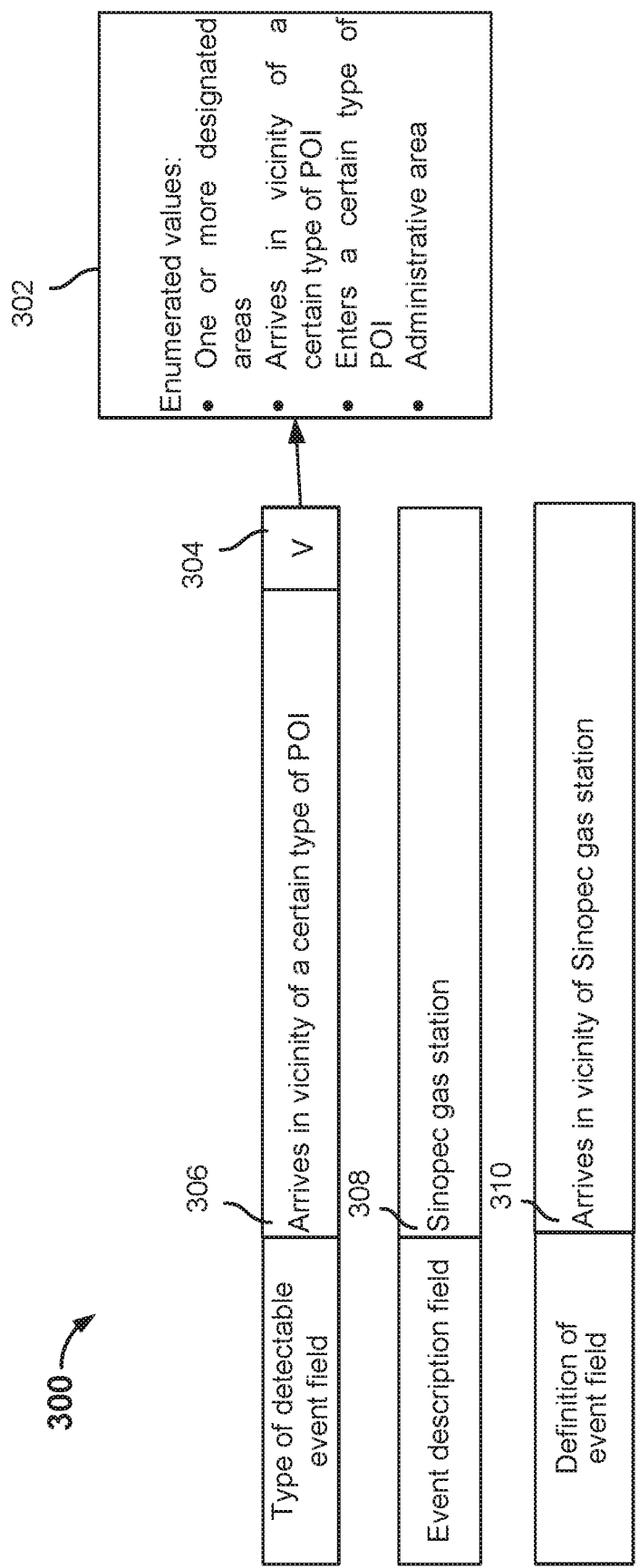
FIG. 3 is a diagram showing a first example user interface for receiving user configured data associated with a detectable event.
Figure 4:
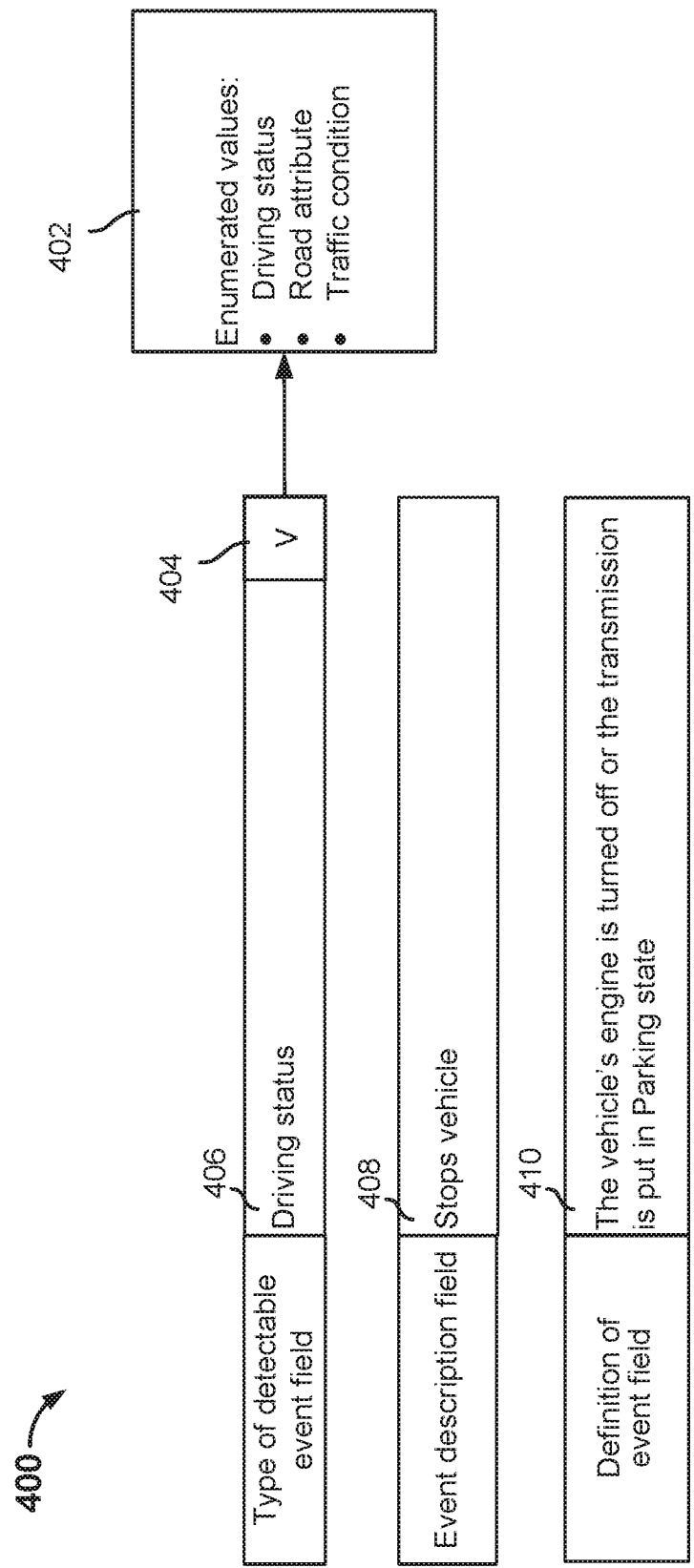
FIG. 4 is a diagram showing a second example user interface for receiving user configured data associated with a detectable event.
Figure 5:
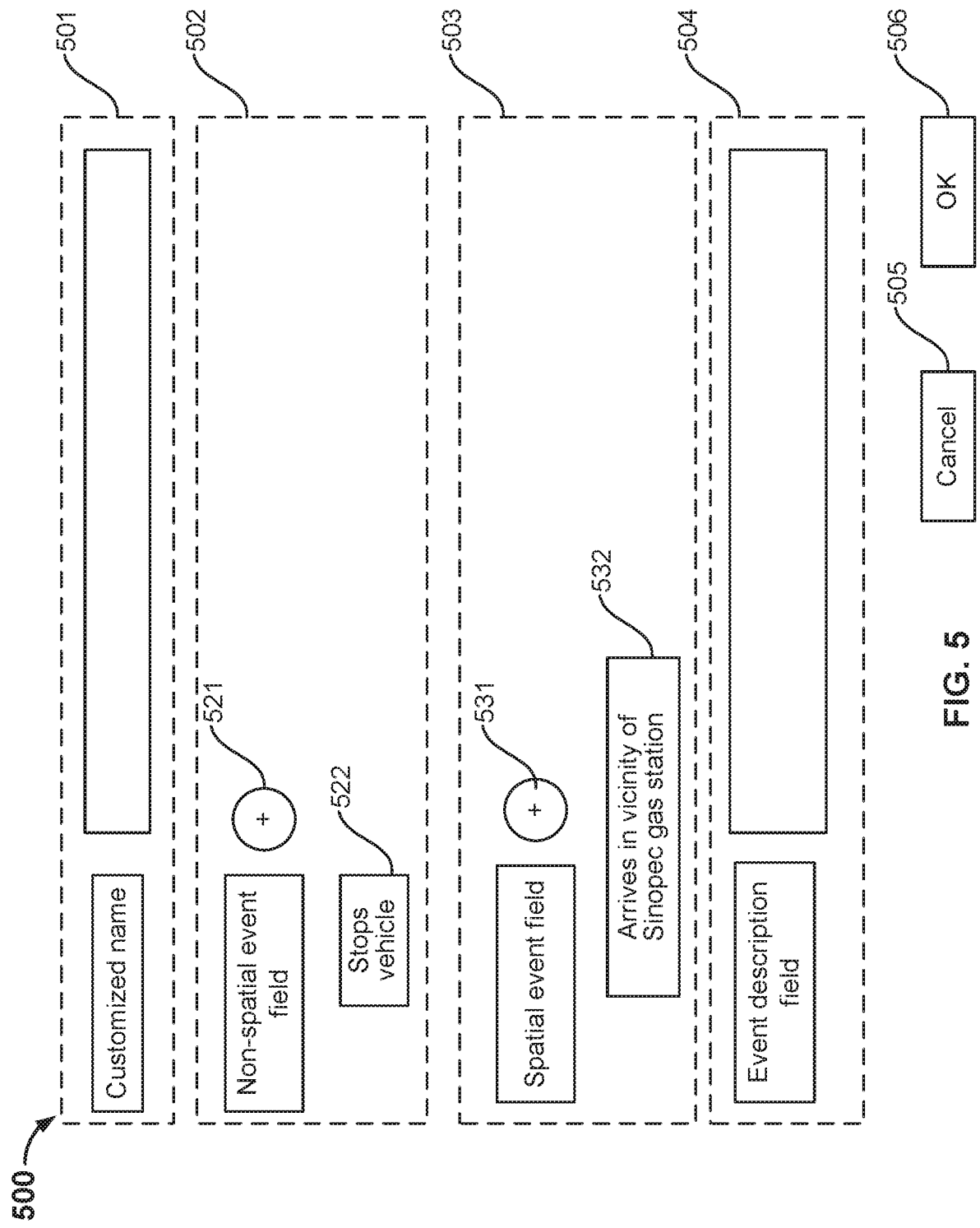
FIG. 5 is a diagram showing a third example user interface for receiving user configured data associated with a detectable event.

Each of the event fields solicits information that describes a detectable event. For example, an event field may include a drop-down menu with a list of enumerated options from which a user may select one. In some embodiments, event fields may include an event type field, an event description field, and an event definition field. In some embodiments, the event fields solicit data that describe one or more conditions associated with determining that the detectable event has occurred. In some embodiments, the event fields solicit the type(s) of data to be collected from one or more type of sensors to compare to the one or more conditions associated with determining that the detectable event has occurred. FIGS. 3, 4, and 5, below, describe two example user interfaces for receiving user configured data associated with a detectable event. For example, a user that inputs data at such a user interface may be a target service provider user and/or an application developer user.

In some other embodiments, the at least one event field is presented in a configuration file instead of the user interface.

At 204, data input into the at least one event field is stored as data associated with the detectable event.

In some embodiments, event fields may include atomic event fields. Atomic event fields may refer to the smallest predetermined constitutive units of a detectable event. Correspondingly, a detectable event may be described by a combination of one or more user selected atomic event fields with predetermined values. Atomic event fields may be spatial and non-spatial related. Spatial event fields include administrative areas, polygonal areas, etc. Non-spatial event fields include parking, start-up, traffic jams, on the highway, etc.

In some embodiments, the event fields may include a spatial event field and/or a non-spatial event field. In various embodiments, a spatial event field may refer to an event field that has a spatial/location attribute and a non-spatial event field may refer to an event field that does not have a spatial/location attribute. For example, the types of areas that correspond to spatial event fields may include: designated area shapes (e.g., polygonal areas or round areas), areas corresponding to points of interest (POI) of a preset type, and administrative areas. For example, a spatial event field may specify entry into an area or into the vicinity of the area (i.e., the distance between the location of the device and the location of the area not exceeding a threshold distance value). Examples of preset types of POIs may include: a vehicle POI, a travel-related POI, a restaurant-related POI, an office building-related POI, and an administrative building-related POI. Examples of vehicle type POIs may include: a gas station, a vehicle repair and maintenance business, etc.

Returning to 206, at least one service field associated with a target service corresponding to the detectable event is presented at the user interface.

Each of the service fields solicits information that describes the target service corresponding to a detectable event. For example, a service field may include a drop-down menu with a list of enumerated options from which a user may select one. In some embodiments, the service fields solicit data (e.g., a link or a URL) that describe one or more entry points to the target service. For example, the link or URL, once activated, will open a web page or an application page corresponding to the target service. In some embodiments, the service fields solicit data (e.g., text, images) that provide an introduction to the target service (e.g., a name of the target service). Introductory data such as a name, a description, an image picture, and other information may add to the user's understanding of the target service and help the user to determine how to use a particular service. In some embodiments, the service fields solicit computer program code that causes an entry point to be output to a device. In some embodiments, the service fields solicit device selection criteria (e.g., specified attributes) of a device and/or a user to which an entry point should be output. In some embodiments, the service fields solicit one or more output modes that can be used to output an entry point to the target service. For example, each output mode is associated with output mode selection criteria (e.g., specified attributes) that describe the type of user and/or the type of device for which such a mode of output should be used.

In some embodiments, a target service configuration user interface may be provided for one detectable event to enable the user to configure at least one service corresponding to this detectable event. In some embodiments, a detectable event configuration user interface may be provided for one target service to enable the user to configure at least one detectable event corresponding to this target service.

In some other embodiments, the at least one service field is presented in a configuration file.

At 208, data input into the at least one service field is stored as data associated the target service corresponding to the detectable event.

At 210, a mapping of the detectable event and the target service is stored.

FIG. 3 is a diagram showing a first example user interface for configuring data associated with a detectable event. In the example of FIG. 3, user interface 300 includes type of detectable event field 306, event description field 308, and definition of event field 310. Type of detectable event field 306 includes drop-down menu 302, which includes the enumerated values of: one or more designated areas, arrives in the vicinity of a certain type of POI, enters a certain type of POI, and administrative area. Because the enumerated values of type of detectable event field 306 in the example of FIG. 3 mentions options pertaining to locations, type of detectable event field 306, event description field 308, and definition of event field 310 may each be considered a spatial event field. After the user had selected the "arrives in vicinity of a certain type of POI" value for type of detectable event field 306, the user inputs "Sinopec gas station" in event description field 308 as a specific description of the POI that is noted in the type of detectable event field. The value of definition of the event field 310 may be automatically generated by combining the input values of type of detectable event field 306 and event description field 308 to help the user determine whether the filled-out event fields conforms to his or her intentions. Therefore, this can increase the accuracy and efficiency of event field configuration. In user interface 300, definition of the event field 310 states: arrives in the vicinity of a Sinopec gas station.

In some embodiments, one or more non-spatial event fields are included in the user interface. Non-spatial event fields refer to fields that do not pertain to location(s). Examples of the non-spatial event field that may be included in a user interface such as user interface 300 of FIG. 3 include:

A "driving status field." Examples of values to be input into such a field include, but are not limited to: starting, stopping, and high-speed driving.

A "road attribute field." Examples of values to be input into such a field include, but are not limited to: highway, provincial road, county road, and urban expressway; or entering main road, frontage road, and ramp.

A "traffic condition field." Examples of values to be input into such a field include, but are not limited to: congested and free-flowing.

A "sensor status field." Examples of values to be input into such a field include, but are not limited to: vehicle tire pressure status, mobile phone accelerometer status, and sensor status of home appliances such as air-conditioners or purifiers.

A "vehicle-third party object relationship field." Examples of values to be input into such a field include, but are not limited to: a distance between vehicle and third party objects on road (e.g., another vehicle, another person, another animal, etc.).

A "weather field." Examples of values to be input into such a field include, but are not limited to: weather conditions in real-time or weather forecasts.

A "user health status field." An example of a value to be input into such a field includes, but is not limited to: user fatigue status.

A "navigation route field." Examples of values to be input into such a field include, but are not limited to: navigation route road condition field, destination field, on-route POI field.

FIG. 4 is a diagram showing a second example user interface for configuring data associated with a detectable event. In the example of FIG. 4, user interface 400 includes type of detectable event field 406, event description field 408, and definition of event field 410. Type of detectable event field 406 includes drop-down menu 402, which includes the following enumerated values of: driving status, route attribute, and traffic condition. After the user had selected the "driving status" value for type of detectable event field 406, the user input "Stops vehicle" in event description field 408 as a specific description of the POI that is noted in the type of detectable event field. The value of definition of event field 410 may be automatically generated by combining the input values of type of detectable event field 402 and event description field 408 to help the user determine whether the filled-out event field conforms to his or her intentions. Therefore, this can increase the accuracy and efficiency of event field configuration. In user interface 400, definition of the event field 410 states: the vehicle's engine is turned off or the transmission is put in the parking state. The parking state locks the axle with the transmission when the vehicle is stationary on a (e.g., sloping) roadway.

FIG. 5 is a diagram showing a third example user interface for configuring data associated with a detectable event. In the example of FIG. 5, user interface 500 includes detectable event name setting area 501, non-spatial event field setting area 502, spatial event field setting area 503, event description area 504, cancellation control 505, and confirmation control 506.

Detectable event name setting area 501 is configured to receive an input custom name value of the detectable event. Non-spatial event field setting area 502 is configured to receive an input value for a non-spatial event field. Non-spatial event field setting area 502 includes control 521, which enables a user to add non-spatial event field value 522 "stops vehicle." Spatial event field setting area 503 is configured to receive an input value for a spatial event field. Spatial event field setting area 503 includes control 531, which enables a user to add spatial event field value 532 "arrives in vicinity of Sinopec gas station." Event description area 504 is configured to receive an input value for a description of the detectable event. Cancellation control 505 is configured to enable the cancellation of a detectable event configuration. Confirmation control 506 is configured to enable the confirmation of a detectable event configuration.

For example, when a user selects control 521, the system may switch to presenting user interface 400 that was shown in FIG. 4. After the user inputs a value into the non-spatial event field as shown in FIG. 4, non-spatial event field setting interface 502 is configured to display corresponding non-spatial event field value 522. By the same token, when a user selects control 531, the system may switch to presenting user interface 500 that was shown in FIG. 5. After the user inputs a value into the spatial event field as shown in FIG. 3, the spatial even field setting interface 503 is configured to display corresponding spatial event field value 532.

While the example of user interface 500 only shows non-spatial event field value 522, user interface 500 may presented more than one non-spatial event field values. While the example of user interface 500 shows only one spatial event field value 532, user interface 500 may presented more than one spatial event field values.

The configured detectable event may be confirmed after a user selection operation on confirmation control 506 is received. A confirmed detectable event may include: m non-spatial event field values 522 and n spatial event field values 532, where m is an integer greater than or equal to 0, and n is an integer greater than or equal to 0 but m and n cannot both be 0.

Table 1, below, shows example mapping relationships between detectable events and target services. In the example of Table 1, each detectable event corresponds to one target service, although in practice, each detectable event may correspond to more than one target services and vice versa.

TABLE 1

| Detectable event | Service |
| --- | --- |
| Vehicle enters gas station A and the vehicle parks | Fueling service |
| Vehicle tire pressure is too high or too low | Vehicle repair service |
| Distance between a vehicle and a third party object is too short | Safety service |
| Adverse weather | Adverse weather insurance service |
| Traffic congestion | Navigation service |
| Vehicle arrives at toll station and drives slowly | Password-free highway toll payment service |

TABLE 1-continued

| Detectable event | Service |
| --- | --- |
| Arrives at navigation destination | Parking service, home appliance control service, etc. |
| Arrives in vicinity of POI along navigation route | POI introduction service |
| Home appliance sensor is in a preset state | Internet of Things service |

In some embodiments, in response to a determination to output an entry point to a target service, output mode information and device selection criteria are used in outputting the entry point.

In various embodiments, the output mode information is configured to describe one or more possible output modes that are usable to output an entry point to a target service to a particular user. As mentioned above, one or more output modes for an entry point to a target service may be user configured. Examples of output modes may include, but are not limited to: system notifications, text messages, application notifications, voice broadcasts, start advertisements (the advertisements when an application is started), map cards, augmented reality (AR) navigation, and HUD. A system notification is a notification with global effect at a device and it is presented at the top of the display screen of the device. In various embodiments, a system notification may display information in a manner that overlays all other content that is currently presented at the display screen. A map card is a display element that may be displayed on an interface of a map application. Information on the card may include, for example, introductory information associated with the target service. The card may also include an entry point to the target service so that after the user activates the map card, a page corresponding to the target service (e.g., a target application) is opened at the device.

The one or more attributes of a device and/or a user to which an entry point should be output corresponding to the service (e.g., device selection criteria) may be used to select a candidate device to which to output the entry point. In some embodiments, such attributes may include at least one of the following types of attributes: user attributes, device attributes, and spatio-temporal attributes, which are further described as follows:

"User attributes" may refer to attributes of a user that is related to a candidate device for outputting the entry point. For example, user attributes may include at least one of the following types of attributes: preference attributes and static attributes, which are described as follows:

"Static attributes" are relatively stable attributes, such as, for example, but are not limited to: age, sex, region, education level, market area, occupation, marital status, level of consumption, and familial role (e.g., whether the user is a father or mother).

"Preference attributes" are generally more dynamic than the relatively stable static attributes described above. Preference attributes can change with changes in user behavior. In some embodiments, preference attributes of the user refer to the user's preference to content (e.g., media or products). These attributes may change as user behavior (at least one of the following behaviors: browsing, searching, collecting, saving, noting, selecting, and evaluating of online content) changes with respect to interaction with content. Some specific examples of preference attributes may include: games that are preferred by the user and music that is preferred by the user.

"Device attributes" may refer to attributes of a device. Device attributes may include, for example, but are not limited to: brand and model. Some specific examples of device attributes include the make and model of a vehicle.

"Spatio-temporal attributes" may refer to the current temporal attributes and spatial attributes corresponding to a device. Spatio-temporal attributes may include, for example, but are not limited to: time period attributes and spatial attributes. For example, for spatial attributes corresponding to "fueling service," a spatial attribute may be "Chaoyang District, Beijing."

As described above, various embodiments described herein enable users to flexibly customize data associated with detectable events and corresponding target services such that mappings between detectable events and corresponding target services can be stored. Thus, the data corresponding to target services can be efficiently updated in light of service modifications of the availability of new services.

Figure 6:
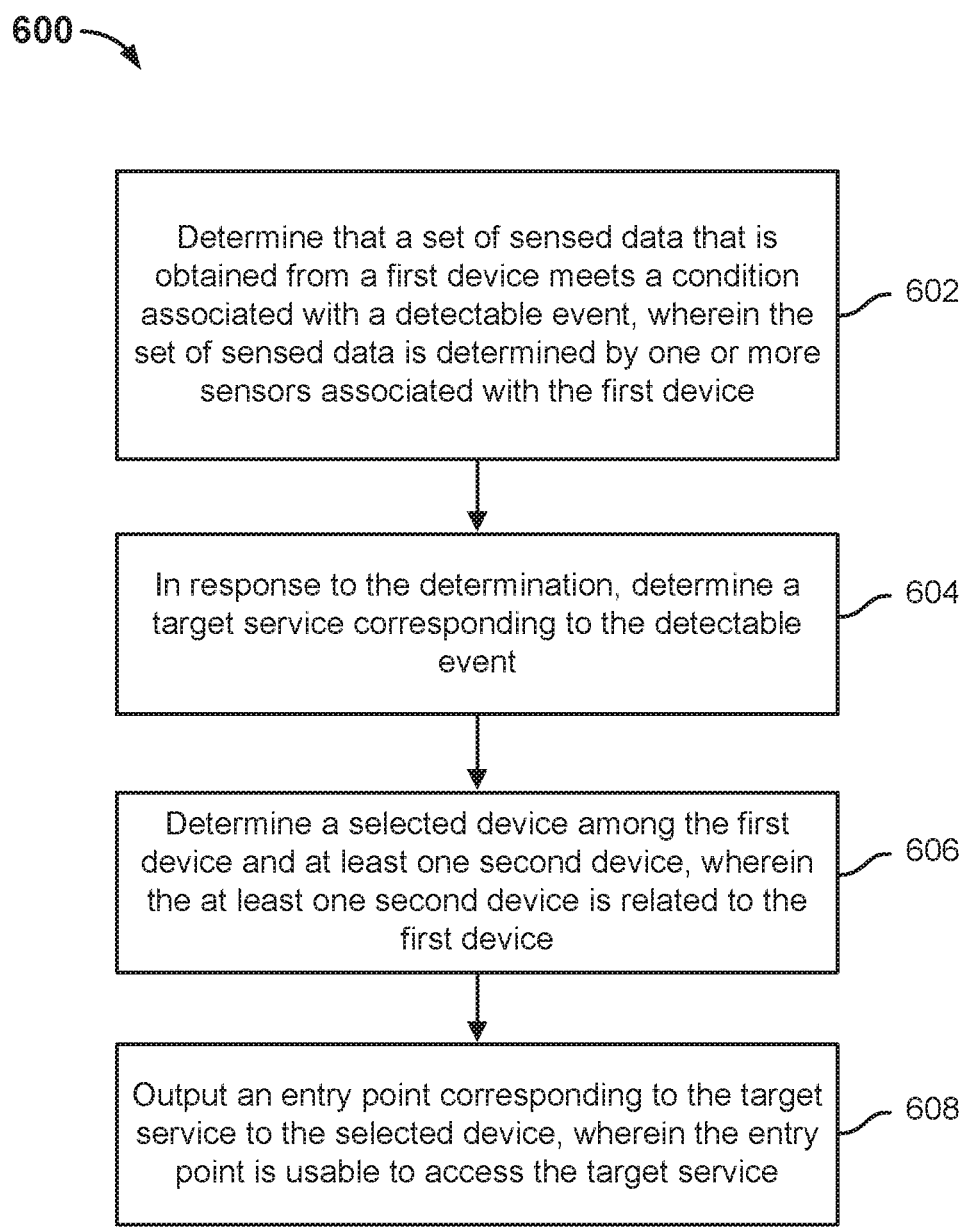
FIG. 6 is a flow diagram showing an embodiment of a process for outputting an entry point to a target service.

FIG. 6 is a flow diagram showing an embodiment of a process for outputting an entry point to a target service. In some embodiments, process 600 is implemented at system 100 of FIG. 1. Specifically, in some embodiments, process 600 is implemented at server 108 or one of first device 102 and second device 104 of system 100 of FIG. 1.

At 602, it is determined that a set of sensed data obtained from a first device meets a condition associated with a detectable event, wherein the set of sensed data is determined by one or more sensors associated with the first device.

In some embodiments, one or more sensors (of one or more sensor types) that are included in the first device are periodically sensing data. The set of sensed data is compared to one or more conditions associated with determining that the detectable event has occurred.

In some embodiments, the first device only collects or stores sensor data according to "collection information" corresponding to a detectable event. In some embodiments, "collection information" describes the types of sensor data that needs to be collected for a detectable event, including the one or more sensor types that are associated with the one or more conditions associated with determining that the detectable event has occurred. For example, the collection information corresponding to a detectable event is derived from the value in the "type of detectable event field" and the value in the "event description field" of the configured data associated with the detectable event.

For example, an event field included in configured data associated with Detectable Event A is "enters Gas Station A." The type of this event field may be spatial. Therefore, it may be determined that the collection information corresponding to Detectable Event A includes: location (which can be determined by a GPS sensor). Another event field included in configured data associated with Detectable event A is "stops vehicle." The type of this event field may be driving status or vehicle speed. Therefore, it may be determined that the collection information corresponding to Detectable Event A also includes: vehicle speed (which can be determined by a GPS sensor or a separate, speed sensor). For example, an event field included in configured data associated with Detectable Event B is "vehicle's tire pressure is too high or too low." The type of this event field may be "vehicle tire pressure." Therefore, it may be determined that the collection information corresponding to Detectable Event B includes: vehicle tire pressure (which can be determined by a pressure sensor). For example, an event field included in Detectable Event C is "distance between vehicle and third party object is too short." The type of this event field may be "distance between vehicle and third party object." Therefore, it may be determined that the collection information corresponding to Detectable Event C includes: the distance between the vehicle and third party object (which can be determined by a proximity sensor). For example, an event field included in Detectable Event D is "adverse weather." The type of this event field may be "weather." Therefore, it may be determined that the collection information corresponding to Detectable event D includes: weather (which can be determined by a temperature sensor or moisture sensor). For example, an event field included in Detectable Event E includes "traffic congestion." The type of this event field may be "traffic conditions." Therefore, it may be determined that the collection information corresponding to Detectable event E includes: traffic conditions (which can be inferred from data collected by a speed sensor and also data collected by a proximity sensor because a vehicle that is located close to other objects and is also moving at a low speed can be inferred to be experiencing traffic congestion).

The one or more conditions associated with determining that the detectable event has occurred can be determined from configured data associated with the detectable event. As mentioned above, the data collected by a device according to the collection information is to be compared to the one or more conditions associated with determining that the detectable event has occurred.

For example, an event field included in Detectable Event A is "enters Gas Station A." As such, the condition associated with determining that Detectable Event A has occurred is: the current GPS data associated with a vehicle matches the location data corresponding to the area within Gas Station A. An event field included in Detectable event F is "arrives in vicinity of Gas Station A." As such, the condition associated with determining that Detectable Event F has occurred is: the current GPS data associated with a vehicle matches to the area around Gas Station A. An event field included in Detectable event B is "vehicle tire pressure is too high or too low." As such, the condition associated with determining that Detectable Event B has occurred is: the vehicle tire pressure is less than a first threshold tire pressure value, or vehicle tire pressure is greater than a second threshold tire pressure value, where the first threshold tire pressure value is less than the second threshold tire pressure value. An event field included in Detectable event C is the "distance between vehicle and third party object is too short." As such, the condition associated with determining that Detectable Event C has occurred is: the current distance between a vehicle and a third party object is less than a predetermined distance value. An event field included in Detectable event D is "adverse weather." As such, the condition associated with determining that Detectable Event D has occurred is: the current weather is windy, the current weather includes torrential rain, and/or the current weather includes snow. An event field included in Detectable Event E includes "traffic congestion." As such, the condition associated with determining that Detectable Event E has occurred is the current traffic that is experienced by a vehicle has a traffic congestion index that is within a preset index range.

The following is an example that shows how sensed data collected by a device can be compared to and match a condition that corresponds to Detectable Event A having occurred: The condition that corresponds to Detectable Event A having occurred is that the current GPS data of a vehicle matches Location Data A corresponding to a gas station and the vehicle is moving at a speed of less than one mile per hour. Due to the location data and speed data being relevant to Detectable Event A, a (e.g., vehicle-mounted) device stores at least real-time location data corresponding to the vehicle that is detected by a GPS sensor and real-time speed of the vehicle that is detected by a speed sensor. Thus, when the collected real-time location data overlaps or is within a predetermined range of Location Data A, and the real-time speed matches a speed is less than one mile per hour, it can be determined that the set of sensed data obtained from the device meets the condition associated with Detectable Event A.

At 604, in response to the determination, a target service corresponding to the detectable event is determined. In various embodiments, the target service corresponding to the detectable event is determined by searching mapping relationships between detectable events and target services. In some embodiments, the target service that corresponds to the detected detectable event is associated with a corresponding target service identifier (ID). In some embodiments, the target service ID can be used to obtain the configured data corresponding to the target service. In some embodiments, the configured data corresponding to the target service includes one or more of the following: entry point(s) to the target service; introductory information associated with the target service; device selection criteria for selecting a device to which an entry point should be output; and output mode information including: one or more output modes that can be used to output an entry point to the target service with one or more attributes that describe the type of user and/or the type of device to which each output mode should be used. The configured data corresponding to the target service is then used to output an entry point to the target service to a device.

At 606, a selected device is determined among the first device and at least one second device, wherein the at least one second device is related to the first device.

In some embodiments, identifying information associated with the user (or group of users) related to the first device from which the set of sensed data is collected, is determined. For example, the set of sensed data includes a user ID pertaining to the user (or group of users). Related relationships between users (or group of users) and devices may be looked up to determine the one or more devices to which the user (or group of users) relates and are therefore related to each other. As will be described in further detail with FIG. 7, below, the current attributes associated with the user and the current attributes associated with each related device is compared to the one or more attributes that describe the type of user and/or the type of device to which each output mode should be used to select an output mode as well as a device to which to provide the entry point to the target service via the output mode. In some embodiments, the selected device may be the same device at which the set of sense data was collected. In some embodiments, the selected device may be a different but related device to the device at which the set of sense data was collected.

At 608, an entry point corresponding to the target service is outputted to the selected device.

As mentioned above, example output modes include: system notifications, text messages, application notifications, voice broadcasts, start advertisements (the advertisements when an application is started), map cards, augmented reality (AR) navigation, and HUD.

In some embodiments, the output mode information may additionally include: an interface (e.g., an Application Programming Interface) corresponding to each respective output mode. In some embodiments, outputting an entry point for a target service using a particular output mode to the user may include sending a call request to the interface associated with that output mode. For example, the call request may include an entry point for the target service. As such, the interface that receives the call request may be caused to perform the outputting of the entry point to the target service via the output mode as well as the selected device. In various embodiments, the entry point comprises data that is usable to access the target service.

For example, the output mode information may include a map card (e.g., a display element to be overlaid on a map interface) output mode, in which case the map card interface may be called, and target service information, including the entry point to the target service, may be transmitted in a call request to the map card interface. Thus, after receiving the call request, the map card interface may start a render program to display the target service information on the map. The majority of users in a driving context use a map application to conduct navigation. Therefore, displaying target service information on an interface of the map application may increase the probability that the user will access the target service.

Various embodiments described herein automatically provide a user with an entry point to a target service that corresponds to a detectable event. Therefore, the user may be provided an opportunity to access a target service that is relevant to a current concern of his or her without needing to manually search or otherwise look for the target service. This is particularly advantageous when the user is currently driving a vehicle and it is important to his or her safety to maintain her or his hands on the wheel and attention on the road as much as possible.

As mentioned above, a device that relates to the user or group of users that corresponds to the device at which a set of sensed data was collected and compared to a condition associated with a detectable event is selected to output an entry point to a target service corresponding to the detectable event. Also, as mentioned above, configured data associated with a target service includes one or more device selection criteria (e.g., specified attributes) to use to select a device to which an entry point should be output. As described above, examples of such attributes may include one or more of the following: user attribute(s), device attribute(s), and spatio-temporal attribute(s). In some embodiments, the device selection criteria that are stored in a target service's configured data is compared to the current attributes of the user and those of the related device(s) that correspond to the device that had collected the set of sensed data to select one of the related device(s) to output the entry point. In some embodiments, the current attributes of the user and those of the related device(s) are attributes obtained within a predetermined, recent window of time. For example, the predetermined, recent window of time is one or two minutes prior to the current time. It is desirable to obtain "current" attributes of the user and those of the related device(s) because those are the attributes that most accurately represent the user and the device(s) can be used in the comparison. In some embodiments, the device whose current attributes most closely matches the device selection criteria of target service's configured data is the device that is selected. The selected device is assumed to be the device that is most suitable to access and use the target service, which will presumably increase the chances that the user will access and use the target service.

In an application example of the present application, let us assume that Target Service S is "fueling service" and that the attributes included in the device selection criteria corresponding to Target Service S for outputting to a vehicle-mounted device may include:

Device model: Volkswagen vehicle;
User attribute: user from 25 to 35 years of age;
Time attribute: evening time period on work day and all time periods on days off; and
Spatial attribute: "Chaoyang District, Beijing."

Figure 7:
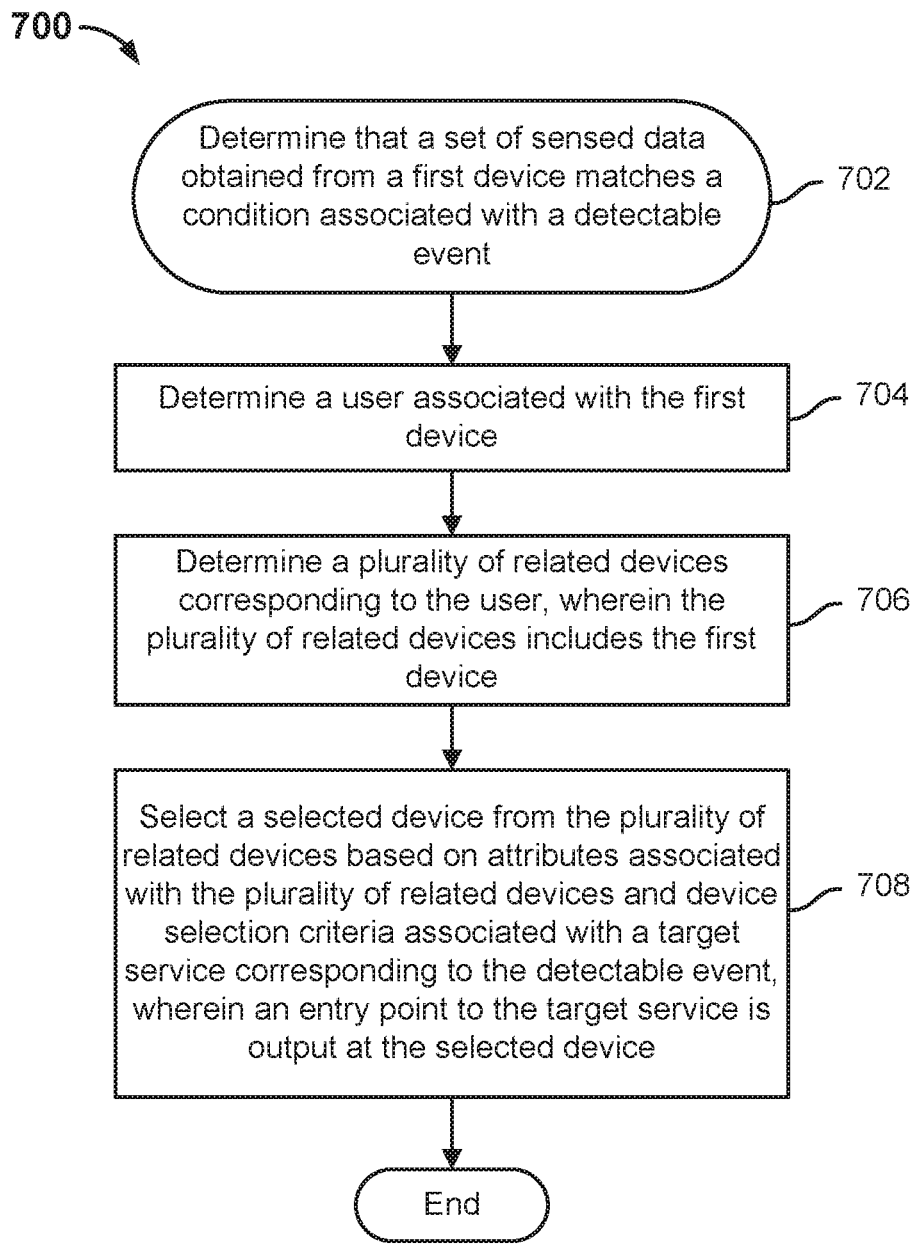
FIG. 7 is a flow diagram showing an example of a process for determining a device to which to output an entry point to a target service.

FIG. 7 is a flow diagram showing an example of a process for determining a device to which to output an entry point to a target service. In some embodiments, process 700 is implemented at system 100 of FIG. 1. Specifically, in some embodiments, process 700 is implemented at server 108 or one of first device 102 and second device 104 of system 100 of FIG. 1.

At 702, it is determined that a set of sensed data obtained from a first device matches a condition associated with a detectable event. For example, step 702 can be determined using a process such as process 600 of FIG. 6.

At 704, a user associated with the first device is determined. In some embodiments, a user or a group of users that is related to the first device is determined from stored related relationships between users and devices.

At 706, a plurality of related devices corresponding to the user is determined, wherein the plurality of related devices includes the first device. All one or more devices that are related to the user or the group of users and are therefore related to each other can also be determined from stored related relationships among devices.

At 708, a selected device is selected from the plurality of related devices based on attributes associated with the plurality of related devices and device selection criteria associated with a target service corresponding to the detectable event, wherein an entry point to the target service is output at the selected device. The current attributes associated with each device (and the current attributes of the related user or groups of users) are determined and compared against the attributes that are included in the device selection criteria associated with the target service corresponding to the detectable event. The device among the related devices whose current attributes that best match (e.g., have the highest percentage of match) with the attributes of the device selection criteria is selected.

Figure 8:
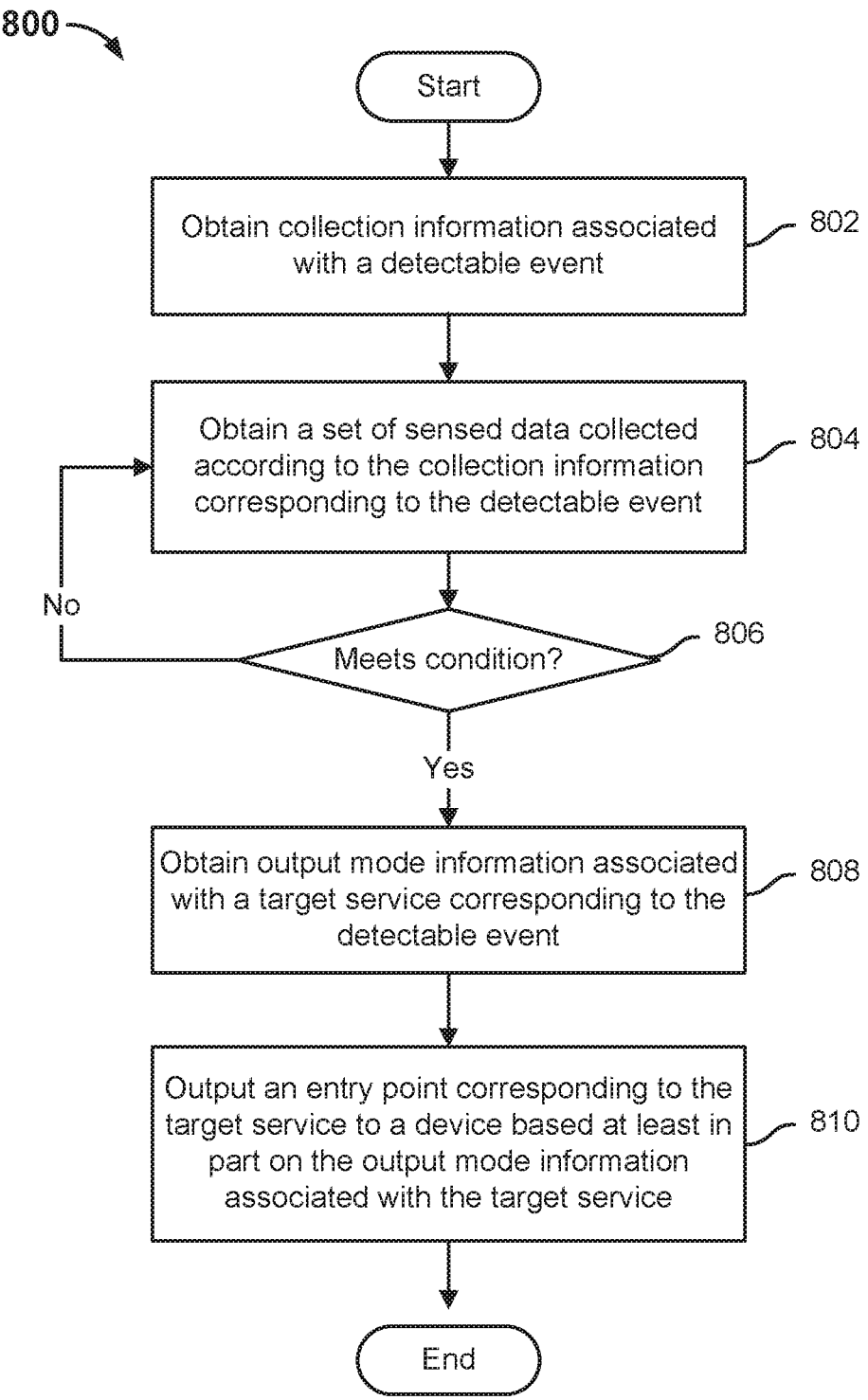
FIG. 8 is a flow diagram showing an example of a process for an output mode with which to output an entry point to a target service.

FIG. 8 is a flow diagram showing an example of a process for an output mode with which to output an entry point to a target service. In some embodiments, process 800 is implemented at system 100 of FIG. 1. Specifically, in some embodiments, process 800 is implemented at server 108 or one of first device 102 and second device 104 of system 100 of FIG.

At 802, collection information associated with a detectable event is received. For example, if process 800 were implemented by a device, then the collection information may be received in a detection task from a server that stores configured data associated with detectable events.

At 804, a set of sensed data that is collected according to the collection information corresponding to the detectable event is obtained.

At 806, it is determined whether the set of sensed data meets the condition associated with the detectable event. In the event that the set of sensed data does not meet the condition associated with the detectable event, control is returned to 804. Otherwise, in the event that the set of sensed data does meet the condition associated with the detectable event, control is transferred to 808. Sensed data is continuously or periodically collected and compared again the condition associated with the detectable event.

At 808, output mode information associated with a target service corresponding to the detectable event is obtained.

At 810, an entry point corresponding to the target service is output to a device based at least in part on the output mode information associated with the target service. In some embodiments, the device to which to output the entry point is determined using a process such as process 700 of FIG. 7. In some embodiments, the entry point is output to the selected device using a selected output mode corresponding to the target service. In some embodiments, the selected output mode is selected using the output mode selection criteria that are included in the output mode information. For example, the output mode selection criteria describe the type of user and/or the type of device to which such each mode of output should be used. The output mode selection criteria are compared against the current attributes of the selected device and those of the user that relates to the selected device to select one output mode whose criteria best matches the current attributes of the selected device and those of the user.

Figure 9:
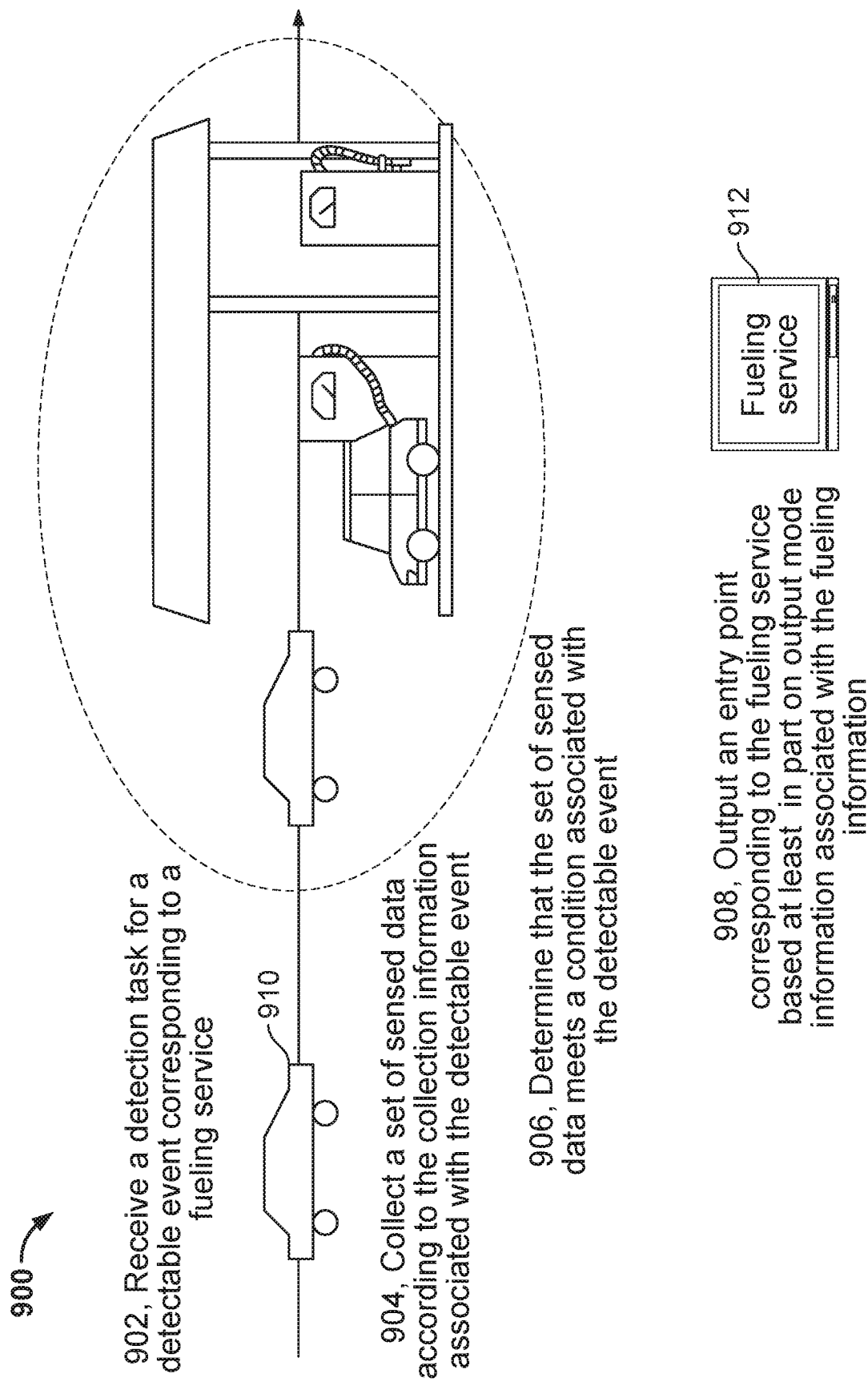
FIG. 9 is a flow diagram showing an example of a process for outputting an entry point to a fueling service to a device.

FIG. 9 is a flow diagram showing an example of a process for outputting an entry point to a fueling service to a device. In the example of FIG. 9, process 900 is implemented at vehicle-mounted device 910.

At 902, a detection task for a detectable event corresponding to a fueling service is received, wherein the detection task comprises collection information associated with the detectable event. For example, the detectable event is that a vehicle has entered the area within a gas station and whose speed is less than one mile per hour. As such, the collection information may describe collecting the vehicle's current location data using a GPS sensor and also the vehicle's current speed using a speed sensor.

At 904, a set of sensed data is collected according to the collection information associated with the detectable event. The current GPS data and the current speed of the vehicle is collected.

At 906, it is determined that the set of sensed data meets a condition associated with the detectable event. The current GPS data and the current speed of the vehicle are compared against the condition of the vehicle having entered the area within a gas station and having a current speed that is less than one mile per hour is met. Therefore, the detectable event of the vehicle entering the gas station and parking inside the gas station is determined to have occurred.

At 908, an entry point corresponding to the fueling service is output to a device based at least in part on output mode information associated with the fueling service. Because a fueling service corresponds to the detectable event, the entry point to the fueling service is output to a selected device, device 912. For example, device 912 could be the same device as vehicle-mounted device 910 at which the set of sensed data was collected or device 912 could be a different device, such as the user's mobile phone. Once the user selects the entry point (e.g., a link or a URL) associated with the fueling service, a web page or an application page corresponding to the fueling service is presented at device 912. In a specific example, at the presented page, the user may use the fueling service by, for example, selecting a grade of fuel to add to his or her vehicle, selecting to have a gas station attendant perform the fueling, and/or inputting payment information to pay for the fueling service.

As shown in the example of FIG. 9, a fueling service (e.g., an application or a website that allows the user to select a grade of fuel to add to his or her vehicle, select to have a gas station attendant perform the fueling, and/or input payment information to pay for the fueling service) may be automatically recommended to the screen of a driving user's device when the vehicle that the user is currently driving arrives at a gas station and stops the within the area of the gas station. This can eliminate the need of the user to perform a search at a device by manually inputting a query for a relevant service.

Figure 10:
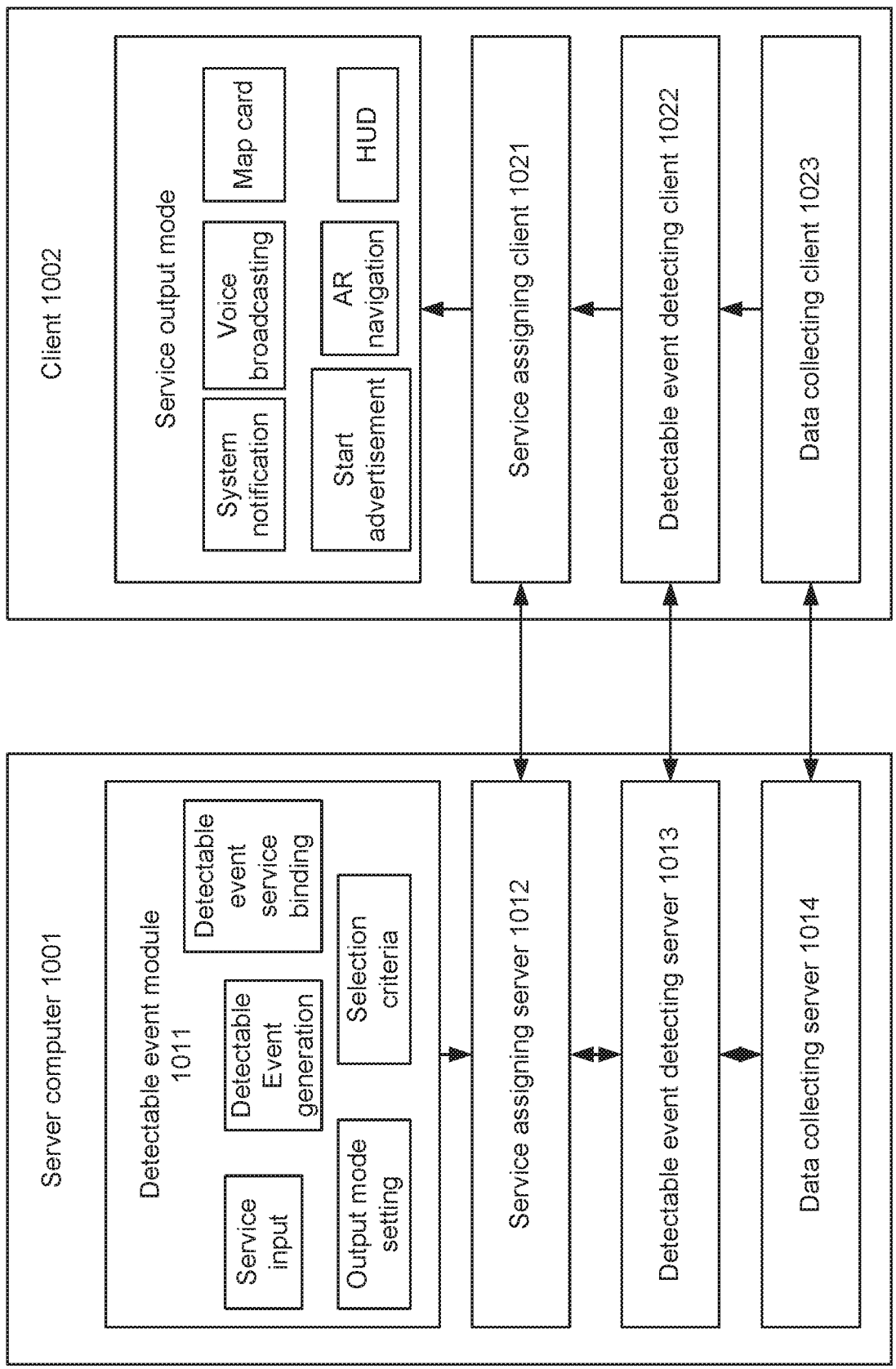
FIG. 10 is a diagram showing an example of a structural diagram of a system for outputting an entry point to a target service.

FIG. 10 is a diagram showing an example of a structural diagram of a system for outputting an entry point to a target service. The example system of FIG. 10 includes server computer 1001 and client 1002.

The modules and sub-modules described above can be implemented as software components executing on one or more processors, as hardware such as programmable logic devices, and/or Application Specific Integrated Circuits designed to elements that can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules and sub-modules may be implemented on a single device or distributed across multiple devices.

Server computer 1001 includes detectable event module 1011, service assigning server 1012, detectable event detecting server 1013, and data collecting server 1014. Client 1002 includes service assigning client 1021, detectable event detecting client 1022, and data collecting client 1023.

Detectable event module 1011, service assigning server 1012, detectable event detecting server 1013, and data collecting server 1014 may be located on the same server computer or different server computers. Various embodiments described herein impose no restrictions as to how the server computer is specifically set up.

Detectable event module 1011 may be configured for a user corresponding to a service provider and may provide the user with a setting interface. It implements the following functions based on human-machine interactions: service input, detectable event generation, detectable event-service binding, output mode setting, and selection criteria.

Service assigning server 1012 and service assigning client 1021 are set up as a pair. Detectable event detecting server 1013 and detectable event detecting client 1022 are configured as a pair, and data collecting server 1014 and data collecting client 1023 are set up as a pair.

Service assigning server 1012 may receive a request sent by detectable event module 1011, and the request may include: a detectable event-service mapping relationship, which contains detectable event information, service information, and output mode information and selection criteria corresponding to the target service.

Service assigning server 1012 is configured to send a target service ID and information on the detectable event related to the target service to detectable event detecting server 1013.

Detectable event detecting server 1013 is configured to create a detection task. The detection task may include: a target service ID and collection information corresponding to a detectable event. Detectable event detecting server 1013 may synchronize the detection task with detectable event detecting client 1022. Detectable event detecting server 1013 may further send collection information to data collecting server 1014. The collection information may server as a collection basis for second data. The collection information may be basic data information, such as location information, road attributes, and vehicle speed, corresponding to first data.

Data collecting server 1014 is configured to send the collection information to data collecting client 1023. Data collecting client 1023 collects second data of a device in real-time according to the collection information and sends it to detectable event detecting client 1022.

Detectable event detecting client 1022 is configured to compare the set of sensed data to the one or more conditions associated with having detected the detectable event to detect in real-time. If it does, it sends a target service ID to service assigning client 1021.

Service assigning client 1021 is configured to the target service ID to service assigning server 1012 and pull service information and output mode information from service assigning server 1012. The output modes may include, but is not limited to: system notifications, voice broadcasts, start advertisements, map cards, AR navigation, and HUD.

For example, the output mode information may include a map card, in which case the map card interface may be called, and service information may be transmitted in the call request. Thus, after receiving the call request, the map card interface may start a render program to display the service information on the map.

Please note that all the method embodiments have been presented as a series of a combination of actions in order to simplify description. However, persons skilled in the art should know that embodiments of the present application are not limited by the action sequences that are described, for some of the steps may make use of another sequence or be implemented simultaneously in accordance with embodiments of the present application.

Figure 11:
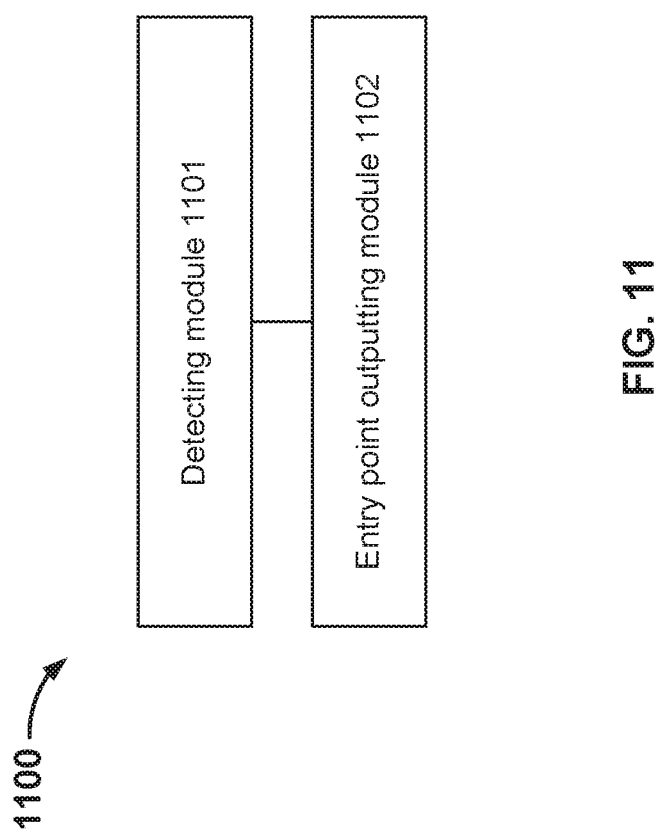
FIG. 11 is a diagram showing an example of a system for outputting an entry point to a target service.

FIG. 11 is a diagram showing an example of a system for outputting an entry point to a target service. System 1100 includes detecting module 1101 and entry point outputting module 1102.

Detecting module 1101 is configured to determine that a set of sensed data obtained from a first device meets a condition associated with a detectable event. The set of sensed data is determined by one or more sensors associated with the first device.

In response to the determination by detecting module 1101, entry point outputting module 1102 is configured to determine a target service corresponding to the detectable event. Furthermore, entry point outputting module 1102 is configured to output an entry point corresponding to the target service to the first device or a second, related device. In some embodiments, whichever of the first device or the second device the entry point is output is selected by comparing device selection criteria associated with the current attributes associated with the first device and second device (and those of their corresponding users).

In some embodiments, system 1100 further includes a first device determining module. In some embodiments, the first device determining module is configured to which device to output an entry point to a target service by comparing device selection criteria associated with the current attributes associated with the first device and second device (and those of their corresponding users).

In some embodiments, system 1100 further includes an event field providing module that is configured to obtain a user configured value corresponding to at least one event field associated with a detectable event.

In some embodiments, system 1100 further includes a detectable event determining module that is configured to generate a set of configured data associated with a detectable event based on the user configured values corresponding to at least one event field.

In some embodiments, the detectable event determining module may include a combining module that is configured to combine multiple atomic event fields selected by the user to determine the detectable event.

In some embodiments, detecting module 1101 includes a receiving module that is configured to receive (e.g., from a server) collection information corresponding to a detectable event and also a condition associated with the detectable event.

In some embodiments, detecting module 1101 includes a collecting module that is configured to use the collection information as a basis to collect a set of sensed data corresponding to the detectable event.

In some embodiments, detecting module 1101 includes a device-detectable event detecting module that is configured to compare the set of sensed data against the condition associated with the detectable event.

In some embodiments, entry point outputting module 1102 may include an information acquiring module that is configured to use a target service ID as a basis to obtain (e.g. from a server) output mode information and the entry point for the target service.

In some embodiments, entry point outputting module 1102 may include an outputting module that is configured to output to the user the entry point for the target service according to the output mode information.

In some embodiments, the output mode information may include an interface and as such, the outputting module may include a call request sending module that is configured to send a call request for the interface. The call request may include an entry point for the target service.

Figure 12:
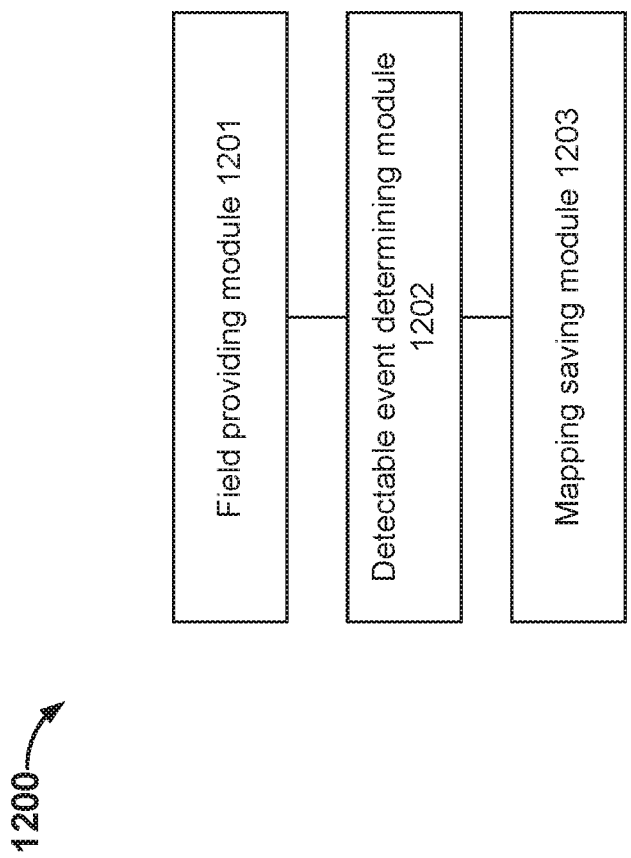
FIG. 12 is a diagram showing an example of a system for configuring data associated with a detectable event.

FIG. 12 is a diagram showing an example of a system for configuring data associated with a detectable event. In the example of FIG. 12, system 1200 includes field providing module 1201, detectable event determining module 1202, and mapping saving module 1203.

Field providing module 1201 is configured to provide at least one event field.

Detectable event determining module 1202 is configured to determine a detectable event based on a user configured value of the event field.

Mapping saving module 1203 is configured to store a mapping relationship between the detectable event and a corresponding user configured target service.

In some embodiments, detectable event determining module 1202 may include a combining module that is configured to combine multiple atomic event fields selected by the user to determine the detectable event.

In some embodiments, an event field may be a spatial event field and/or a non-spatial event field.

In some embodiments, a non-spatial event field may include at least one of the following fields:
  driving status field;
  road attribute field;
  traffic condition field;
  sensor status field;
  vehicle-third party object relationship field;
  weather field;
  user health status field; and
  navigation route field.

In some embodiments, system 1200 further includes an output mode attribute determining module that is configured to compare device selection criteria associated with a detectable event and current attributes associated with devices that are related to a user (or group of users) for the detectable event to select a device to which to output an entry point to a target service corresponding to the detectable event.

In some embodiments, system 1200 further includes an entry point module that is configured to output, to the selected device, an entry point to a target service corresponding to the detectable event.

Each of the embodiments included in this specification is described in a progressive manner. The explanation of each embodiment focuses on areas of difference from the other embodiments, and the descriptions thereof may be mutually referenced for portions of each embodiment that are identical or similar.

With regard to the means in the embodiment described above, the particular ways in which the various modules execute operations have already been described in detail in the method embodiments and will not be explicated in detail here.

An embodiment of the embodiments of the present application may be implemented as a system or apparatus configured as desired using any suitable hardware and/or software.

Figure 13:
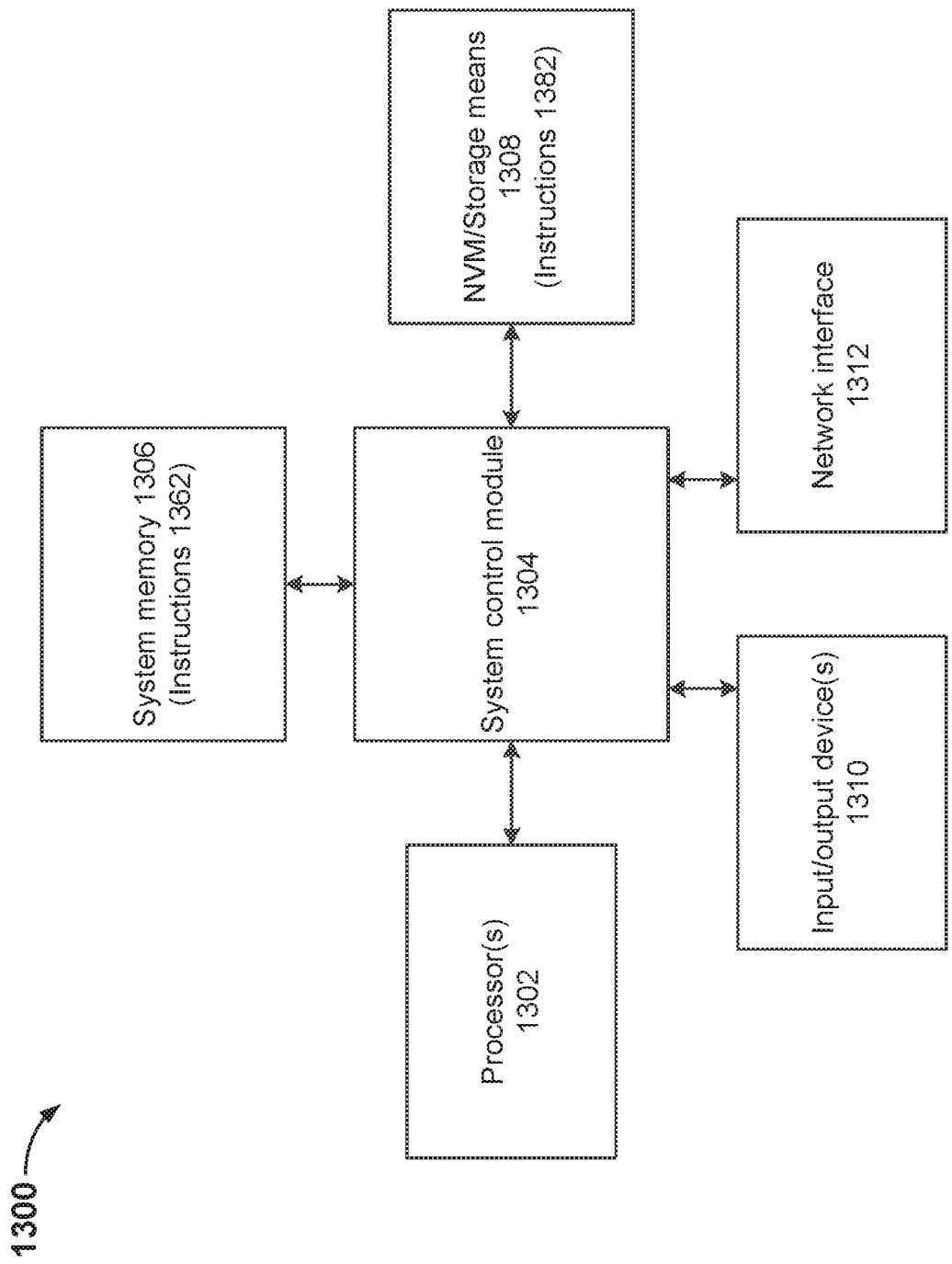
FIG. 13 is a diagram of an example system for outputting an entry point to a target service.

FIG. 13 is a diagram of an example system for outputting an entry point to a target service.

In the example of FIG. 13, system 1300 may include: one or more processors 1302, system control module (e.g., chipset) 1304 coupled to at least one of the processors 1302, system memory 1306 coupled to system control module 1304, non-volatile memory (NVM)/storage means 1308 coupled to system control module 1304, one or more input/output devices 1130 coupled to system control module 1304, and network interface 1312 coupled to system control module 1306. System memory 1306 may include instructions 1362. Instructions 1362 may be executed by one or more processors 1302.

One or more processors 1302 may include one or more single-core or multi-core processors. One or more processors 1302 may include any combination of general-purpose processors or special-purpose processors (e.g., graphics processors, application processors, baseband processors, etc.). In some embodiments, system 1300 can serve as the server computer, target device, wireless device, etc., of an embodiment of the present application.

In some embodiments, system 1300 may include one or more machine-readable media (e.g., system memory 1306 or NVM/storage means 1308) that have instructions and one or more processors 1302 combined with the one or more machine-readable media and configured to execute the instructions to implement modules included in the apparatus described above and thus to execute actions described in embodiments of the present application.

System control module 1304 of an embodiment may include any suitable interface controller to provide any suitable interface to at least one of the processors 1302 and/or any suitable means or component communicating with system control module 1304.

System control module 1304 of an embodiment may include one or more memory controllers so as to provide interfaces to system memory 1306. The memory controller may be a hardware module, a software module, and/or a firmware module.

System memory 1306 of an embodiment may be used to load and store data and/or instructions 1362. With regard to an embodiment, system memory 1306 may include any suitable volatile memory, e.g., dynamic random-access memory (DRAM). In some embodiments, system memory 1306 may include Double Data Rate 4. Synchronous Dynamic Random-Access Memory (DDR4 SDRAM).

System control module 1304 of an embodiment may include one or more input/output controllers to provide interfaces to NVM/memory means 1308 and (one or more) input/output devices 1310.

NVM/memory means 1308 of an embodiment may be used to store data and/or instructions 1382. NVM/memory means 1308 may include any suitable non-volatile memory (such as flash memory) and/or include any suitable (one or more) non-volatile storage device such as one or more hard disk drives (HDD), one or more optical disk (CD) drives, and/or one or more digital versatile disk (DVD) drives.

NVM/storage means 1308 may include a portion of the memory resources included in the means physically installed on system 1300 or that can be accessed by the apparatus but that do not constitute a part thereof. For example, NVM/storage means 1308 may be accessed by a network and/or input/output device 1310 via network interface 1312.

(One or more) input/output devices 1310 of an embodiment may provide interfaces for system 1300 so as to communicate with any other appropriate device. Input/output device 1310 may include a communication component, an audio component, a sensor component, and so on.

Network interface 1312 of an embodiment may provide an interface for system 1300 so as to communicate via one or more networks and/or with any other suitable apparatus. System 1300 may conduct wireless communication based on any standard and/or protocol from among one or more wireless standards and/or protocols with one or more components of a wireless network. For example, it may access a wireless network based on a communication standard such as WiFi, 2G, 3G, or a combination thereof and conduct communication.

With regard to an embodiment, at least one of the processors 1302 may be packaged together with the logic of one or more controllers (e.g., memory controllers) of system control module 1304. With regard to an embodiment, at least one of the processors 1302 may be packaged together with the logic of one or more controllers of system control logic module 1304 to form a system-inpackage (SiP). With regard to an embodiment, at least one of the processors 1302 may be integrated with the logic of one or more controllers of system control module 1304 in a single new product. With regard to an embodiment, at least one of the processors 1302 may be integrated with the logic of one or more controllers of the system control module 1304 to form a system-on-a-chip (SoC) on a single chip.

In each embodiment, system 1300 may include, but is not limited to computing devices such as: a desktop computer or mobile computing device (such as a laptop computer, a handheld computer device, a tablet computer, or a netbook). In each embodiment, system 1300 may have more or fewer components and/or different architectures. For example, in some embodiments, system 1300 may include one or more cameras, keyboards, liquid crystal display (LCD) screens (including touchscreen displays), and non-volatile memory ports, and multiple antennae, graphic chips, application-specific integrated circuits (ASIC), and amplifiers.

If the display comprises a touch panel, the display screen may be implemented as a touchscreen display to receive input signals from the user. The touch panel comprises one or more touch sensors to detect touch, sliding actions, and gestures on the touch panel. The touch sensor can not only detect the boundaries of touch or slide actions, but also measure the duration and pressure related to the touch or slide operations.

An embodiment of the present application further provides a non-volatile, readable storage medium. The storage medium stores one or more modules (programs), and when these one or more modules are applied on an apparatus, they cause the apparatus to execute the instructions of each process in embodiments of the present application.

An apparatus is provided in an example. It includes: one or more processors and one or more machine-readable media in which are stored instructions, which, when executed by the one or more processors, cause the apparatus to execute processes described herein.

In an example, there are provided one or more machine-readable media on which are stored instructions, which, when executed by one or more processors, cause the apparatus to execute processes described herein.

With regard to the apparatus in the embodiment described above, the particular ways in which the various modules execute operations have already been described in detail in the process embodiments and will not be explicated in detail here. One may refer to some of the explanations in the process embodiments where appropriate.

Each of the embodiments contained in this specification is described in a progressive manner. The explanation of each embodiment focuses on areas of difference from the other embodiments, and the descriptions thereof may be mutually referenced for portions of each embodiment that are identical or similar.

Embodiments of the present application is described with reference to flow charts and/or block diagrams based on methods, devices (systems) and computer program products of the embodiments of the present application. Please note that each process and/or block within the flowcharts and/or block diagrams and combinations of processes and/or blocks within the flowcharts and/or block diagrams can be implemented by computer instructions. These computer program instructions can be provided to a general-purpose computer, a special-purpose computer, embedded processors, or processors of other programmable data-processing apparatuses to give rise to a machine such that the instructions executed by the processors of the computer or other programmable data-processing apparatuses give rise to apparatuses used to implement the functions specified in one or more processes in a flowchart and/or in one or more blocks in a block diagram.

These computer program instructions can also be stored in computer-readable memory that can guide computers or other programmable data-processing apparatuses to operate according to specific modes, with the result that the instructions stored in this computer-readable memory give rise to products that include command means. These command means implement the functions specified in one or more processes in a flow chart and/or one or more blocks in a block diagram.

These computer program instructions can also be loaded onto a computer or other programmable data-processing apparatus, with the result that a series of operating steps are executed on a computer or other programmable apparatus so as to give rise to computer processing. In this way, the instructions executed on a computer or other programmable apparatus provide steps for implementing the functions specified by one or more processes in a flow chart and/or one or more blocks in a block diagram.

Although preferred embodiments of the present application have already been described, persons skilled in the art can make other modifications or revisions to these embodiments once they grasp the basic creative concept. Therefore, the attached claims are to be interpreted as including the preferred embodiments as well as all modifications and revisions falling within the scope of the embodiments of the present application.

Lastly, it must also be explained that, in this document, relational terms such as "first" or "second" are used only to differentiate between one entity or operation and another entity or operation, without necessitating or implying that there is any such actual relationship or sequence between these entities or operations. Furthermore, the terms "comprise" or "contain" or any of their variants are to be taken in their non-exclusive sense. Thus, processes, methods, objects, or means that comprise a series of elements not only comprise those elements, but also comprise other elements that have not been explicitly listed or elements that are intrinsic to such processes, methods, objects, or means. In the absence of further limitations, for an element that is limited by the phrase "comprises a(n) . . . ", the existence of additional identical elements in processes, methods, objects or means that comprise the elements is not excluded.

Detailed introductions were provided above to a data processing method, a data processing means, an apparatus, and a machine-readable medium provided by the present application. This document has applied specific examples to explain the principles and implementations of the present application. The above descriptions of the embodiments are only for the purpose of aiding the understanding of the methods and core concepts of the present application. A person with ordinary skill in the art will always be able to make modifications in keeping with the idea of the present application to specific embodiments and scopes of application. The content of this specification should not be understood as limiting the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    one or more processors;
    a point of interest (POI) database;
    a user interface; and
    one or more memories coupled to the one or more processors and to the user interface, wherein the one or more memories are configured to provide the one or more processors and the user interface with instructions, wherein the instructions when executed cause the one or more processors to:
        present at least one event field associated with describing a detectable event at the user interface, wherein the at least one event field is associated with an enumerated value comprising one or more of the following: a designated area, a POI, an administrative area, a driving status, a road attribute, and a traffic condition;
        store a mapping of the detectable event and a target service;
        determine that a set of sensed data meets a condition associated with the detectable event, wherein the set of sensed data is determined by one or more sensors associated with a first device, and is obtained from the first device;
        in response to the determination, determine the target service corresponding to the detectable event;
        determine a selected device among the first device and at least one second device, wherein the at least one second device is related to the first device by at least one relationship parameter; and
        output an entry point corresponding to the target service to the selected device, wherein the entry point is usable to access the target service.

2. The system of claim 1, wherein the set of sensed data is collected according to collection information associated with the detectable event.

3. The system of claim 1, wherein the one or more memories are further configured to provide the one or more processors with instructions which when executed cause the one or more processors to:
    store data input into the at least one event field as data associated with the detectable event;
    present at least one service field associated with describing the target service corresponding to the detectable event at the user interface; and
    store data input into the at least one service field as data associated with the target service corresponding to the detectable event.

4. The system of claim 1, wherein the one or more memories are further configured to provide the one or more processors with instructions which when executed cause the one or more processors to:
    determine a user associated with the first device;
    determine a plurality of related devices corresponding to the user, wherein the plurality of related devices includes the first device and the at least one second device; and
    wherein the selected device is determined based on attributes associated with the plurality of related devices and device selection criteria associated with the target service corresponding to the detectable event.

5. The system of claim 1, wherein the entry point comprises a link or a URL.

6. The system of claim 1, wherein the one or more memories are further configured to provide the one or more processors with instructions which when executed cause the one or more processors to:
    obtain output mode information associated with the target service corresponding to the detectable event; and
    determine an output mode to use to output the entry point based at least in part on the output mode information.

7. The system of claim 6, wherein the output mode comprises one or more of the following: a system notification, a text message, an application notification, a voice broadcast, a start advertisement, a map card, an augmented reality (AR) navigation, and a heads up display (HUD).

8. The system of claim 6, wherein to output the entry point corresponding to the target service comprises to send a call request to an interface, wherein the call request includes the entry point.

9. The system of claim 1, wherein the one or more memories are further configured to provide the one or more processors with instructions which when executed cause the one or more processors to:
    receive a user selection with respect to the entry point; and
    cause a page corresponding to the target service to be presented, wherein the page comprises a web page or an application page.

10. A method, comprising:
    presenting at least one event field associated with describing a detectable event at a user interface, wherein the at least one event field is associated with an enumerated value comprising one or more of the following: a designated area, a point of interest (POI), an administrative area, a driving status, a road attribute, and a traffic condition;

storing a mapping of the detectable event and a target service;

determining that a set of sensed data that is obtained from a first device meets a condition associated with the detectable event, wherein the set of sensed data is determined by one or more sensors associated with the first device;

in response to the determination, determining the target service corresponding to the detectable event;

determining a selected device among the first device and at least one second device, wherein the at least one second device is related to the first device by at least one relationship parameter; and outputting an entry point corresponding to the target service to the selected device, wherein the entry point is usable to access the target service.

11. The method of claim 10, wherein the set of sensed data is collected according to collection information associated with the detectable event.

12. The method of claim 10, further comprising:
storing data input into the at least one event field as data associated with the detectable event;
presenting at least one service field associated with describing the target service corresponding to the detectable event at the user interface; and
storing data input into the at least one service field as data associated with the target service corresponding to the detectable event.

13. The method of claim 10, further comprising:
determining a user associated with the first device;
determining a plurality of related devices corresponding to the user, wherein the plurality of related devices includes the first device and the at least one second device; and
wherein the selected device is determined based on attributes associated with the plurality of related devices and device selection criteria associated with the target service corresponding to the detectable event.

14. The method of claim 10, further comprising:
obtaining output mode information associated with the target service corresponding to the detectable event; and
determining an output mode to use to output the entry point based at least in part on the output mode information.

15. The method of claim 14, wherein the output mode comprises one or more of the following: a system notification, a text message, an application notification, a voice broadcast, a start advertisement, a map card, an augmented reality (AR) navigation, and a heads up display (HUD).

16. The method of claim 14, wherein outputting the entry point corresponding to the target service comprises sending a call request to an interface, wherein the call request includes the entry point.

17. The method of claim 10, further comprising:
receiving a user selection with respect to the entry point; and
causing a page corresponding to the target service to be presented, wherein the page comprises a web page or an application page.

18. A computer program product, the computer program product being embodied in a non-transitory computer readable storage medium and comprising computer instructions for:

presenting at least one event field associated with describing a detectable event at a user interface, wherein the at least one event field is associated with an enumerated value comprising one or more of the following: a designated area, a point of interest (POI), an administrative area, a driving status, a road attribute, and a traffic condition;

storing a mapping of the detectable event and a target service;

determining that a set of sensed data that is obtained from a first device meets a condition associated with the detectable event, wherein the set of sensed data is determined by one or more sensors associated with the first device;

in response to the determination, determining the target service corresponding to the detectable event;

determining a selected device among the first device and at least one second device, wherein the at least one second device is related to the first device by at least one relationship parameter; and outputting an entry point corresponding to the target service to the selected device, wherein the entry point is usable to access the target service.

19. The computer program product of claim 18, wherein the set of sensed data is collected according to collection information associated with the detectable event.

20. The computer program product of claim 18, further comprising computer instructions for:
storing data input into the at least one event field as data associated with the detectable event;
presenting at least one service field associated with describing the target service corresponding to the detectable event at the user interface; and
storing data input into the at least one service field as data associated with the target service corresponding to the detectable event.

21. The system of claim 1, wherein the detectable event comprises one or more of the following: a vehicle driving into a specified location, the vehicle being in a traffic jam, a tire pressure meeting a first specified condition, a distance between the vehicle and a third party object meeting a second specified condition, the vehicle arriving at a toll station, the vehicle arriving at a navigation destination, the vehicle arriving in a vicinity of a point of interest, and a home appliance sensor being in a preset state.

* * * * *